United States Patent
Park et al.

(10) Patent No.: US 11,055,603 B2
(45) Date of Patent: Jul. 6, 2021

(54) NEUROMORPHIC SYSTEM AND MEMORY DEVICE HAVING STACKED SYNAPSE ELEMENTS CONNECTED IN PARALLEL

(71) Applicants: Seoul National University R&DB Foundation, Seoul (KR); Pusan National University Industry-University Cooperation Foundation, Busan (KR)

(72) Inventors: ByungGook Park, Seoul (KR); Yoon Kim, Busan (KR); Hyungjin Kim, Seoul (KR)

(73) Assignee: PUSAN NATIONAL UNIVERSITY INDUSTRY-UNIVERSITY COOPERATION FOUNDATION

( * ) Notice: Subject to any disclaimer, the term of this patent is extended or adjusted under 35 U.S.C. 154(b) by 1034 days.

(21) Appl. No.: 15/643,902

(22) Filed: Jul. 7, 2017

(65) Prior Publication Data
US 2018/0232628 A1    Aug. 16, 2018

(30) Foreign Application Priority Data
Feb. 14, 2017    (KR) .................. 10-2017-0020130

(51) Int. Cl.
*G06N 3/04* (2006.01)
*G06N 3/063* (2006.01)

(52) U.S. Cl.
CPC .............. *G06N 3/04* (2013.01); *G06N 3/063* (2013.01)

(58) Field of Classification Search
CPC ................................ G06N 3/04; G06N 3/063
See application file for complete search history.

(56) References Cited

U.S. PATENT DOCUMENTS

| 5,442,209 A | * | 8/1995 | Chung | ................ H01L 29/7831 |
| | | | | 257/270 |
| 8,510,239 B2 | | 8/2013 | Modha | |
| 2013/0311413 A1 | * | 11/2013 | Rose | .................... G06N 3/0635 |
| | | | | 706/25 |

FOREIGN PATENT DOCUMENTS

| JP | 3305267 B2 | 7/2002 |
| JP | 2004095162 A | 3/2004 |

(Continued)

OTHER PUBLICATIONS

Garbin et al. HfO2-Based OxRAM Devices as Synapses for Convolutional Neural Networks. IEEE Transactions on Electron Devices, vol. 62, No. 8, Aug. 2015 (Year: 2015).*

(Continued)

*Primary Examiner* — Alexey Shmatov
*Assistant Examiner* — Robert Bejcek, II
(74) *Attorney, Agent, or Firm* — Carter, DeLuca & Farrell LLP

(57) ABSTRACT

A neuromorphic system and a memory device are provided. The neuromorphic system includes input neurons that provide input signals, output neurons that provide output signals, and a plurality of synapse units provided at interconnecting points between the input neurons and the output neurons. Each of the synapse units has a structure in which a plurality of synapse elements are connected in parallel to each other between one input neuron among the input neurons and one output neuron among the output neurons. Both of a multi-level operation and information retention are satisfied. The weight of a synapse unit is gradually and symmetrically changed. The synapse elements are stacked in a 3D stack structure, thereby increasing the number of levels, which is able to be implemented, and thereby representing a high degree of integration.

18 Claims, 26 Drawing Sheets

(56) References Cited

FOREIGN PATENT DOCUMENTS

| KR | 2013-0114183 A | 10/2013 |
| KR | 10-2015-0034900 A | 4/2015 |
| KR | 10-2016-0090533 A | 8/2016 |

OTHER PUBLICATIONS

Bill et al. A compound memristive synapse model for statistical learning through STDP in spiking neural networks. Frontiers in Neuroscience. Dec. 2014 | vol. 8 | Article 412 (Year: 2014).*
Prezioso, M. et al. "Training and operation of an integrated neuromorphic network based on metaloxide memristors" Nature, vol. 521, 2015. (19 pages).

* cited by examiner

NEUROMORPHIC SYSTEM AND MEMORY DEVICE HAVING STACKED SYNAPSE ELEMENTS CONNECTED IN PARALLEL

CROSS-REFERENCE TO RELATED APPLICATIONS

A claim for priority under 35 U.S.C. § 119 is made to Korean Patent Application No. 10-2017-0020130 filed on Feb. 14, 2017, in the Korean Intellectual Property Office, the entire contents of which are hereby incorporated by reference.

BACKGROUND

Embodiments of the inventive concept described herein relate to a neuromorphic system and a memory device.

Studies and researches have been carried out on neuromorphic systems for mimicking neurons and synapses to implement Artificial Intelligence (AI) in hardware. FIG. 1 is a view illustrating the configuration of a conventional neuromorphic system. As illustrated in FIG. 1, the conventional neuromorphic system 10 is provided in a structure which a synapse unit 14 including a single synapse element is coupled to each intersecting point 12 in an array having a second dimensional (2D) cross-bar form between an input neuron and an output neuron. However, the synapse unit 14 including the single synapse element does not sufficiently satisfy requirements for implementing high-performance AI.

FIG. 2 is a view conceptually illustrating a state margin of the synapse unit constituting the conventional neuromorphic system. As illustrated in FIG. 2, in the case of a multi-level operation, more states have to be present in a memory window of the single synapse element when comparing with those of a single bit operation. In the multi-level operation, as the number of levels, which are able to be stored in the synapse unit, is increased, the state margin is narrowed. Accordingly, it is difficult to distinguish between states and to satisfy the reliability requirements such as retention and endurance.

For example, when a single synapse element is implemented with a memristor based on a next-generation memory, it is significantly hard to satisfy both of a multi-level operation of 32 ($2^5$) levels or more and the information retention for 10 years or more. In addition, it is difficult ensure an excellent characteristic in the terms of stability. In the conventional neuromorphic system, most memristors may not accurately control the weight of the synapse unit since a SET (of increasing the weight) operation or a RESET (of decreasing the weight) operation is asymmetrically performed and rapidly occurs.

SUMMARY

Embodiments of the inventive concept provide neuromorphic systems and memory devices, capable of satisfying both of multi-level operations and information retention.

Embodiments of the inventive concept provide neuromorphic systems, capable of gradually and symmetrically changing the weights of synapse units, and memory devices.

Embodiments of the inventive concept provide neuromorphic systems, capable of increasing the number of levels, which is able to be implemented through synapse units, and of representing a high degree of integration, and memory devices.

The objects of the inventive concept are not limited to the above-described objects. Other objects, which are not mentioned, will be apparently understood from the following description to those skilled in the art to which the inventive concept pertains.

One aspect of embodiments of the inventive concept is directed to provide a neuromorphic system including input neurons that provides input signals, output neurons that provides output signals, and a plurality of synapse units provided at interconnecting points between the input neurons and the output neurons. Each of the synapse units has a structure in which a plurality of synapse elements are connected in parallel to each other between one input neuron among the input neurons and one output neuron among the output neurons.

The neuromorphic system may further include a selection unit connected between the input neuron and the synapse units to select at least one, which is to transmit the input signal from the input neuron, from the synapse elements.

The selection unit may include pass transistors connected with the synapse elements, respectively, in series.

The selection unit may further include a controller that controls operations of the pass transistors to adjust a weight of the synapse units.

Each pass transistor may have a channel width corresponding to a conductance of the synapse element connected with the pass transistor.

The synapse elements may be stacked.

The synapse unit may include electrodes spaced apart from each other in a vertical direction while being stacked, and capable of being connected with the input neuron; a pillar electrode provided in the vertical direction, connected with the output neuron, and configured to face the electrodes or inserted in the electrodes; and a resistive switching layer interposed between the pillar electrode and the electrodes and including a material allowing resistive switching depending on the input signal of the input neuron and the output signal of the output neuron.

The synapse units may be formed in a plurality of rows and a plurality of columns and arranged in a lattice structure, synapse units arranged in different rows may be electrically connected with mutually different input neurons; and the pillar electrode may be shared between two synapse units arranged in an identical column and arranged in two adjacent rows.

The pillar electrode may be shared between two synapse units arranged in an identical column and arranged in two adjacent rows.

The pillar electrodes of the synapse units may be arranged in a checker board pattern or zigzag pattern in a row direction.

A flat area or a diameter of the pillar electrode may vary in the vertical direction.

The pillar electrode may have a cylindrical shape or a truncated cone shape.

The synapse elements may be provided to have conductances different from each other.

The conductances of the synapse elements may be doubly increased.

The synapse element may include a resistive switching material, a phase change material, or a memory cell.

Another aspect of embodiments of the inventive concept is directed to provide a memory device including word lines, bit lines, and a plurality of memory cells provided at interconnecting points between the word lines and the bit lines. Each of the memory cells has a structure in which a plurality of memory elements are connected in parallel to each other between one word line among the word lines and one bit line among the bit lines, the memory cells are formed in a lattice structure including a plurality of rows and a plurality of columns, and memory cells arranged in an identical row are capable of being connected with an identical word line among the word lines. The memory device further includes a selection unit connected between the word line and the memory cells arranged in the identical row, and the selection unit selects at least one memory element, which is to transmit a voltage of the word line, from the memory elements.

The selection unit may include pass transistors connected with the memory elements in series, respectively, and a controller that controls operations of the pass transistors.

The memory elements may be stacked.

The memory cell may include electrodes spaced apart from each other in a vertical direction, and capable of being connected with the word line; a pillar electrode provided in the vertical direction, connected with the bit line, and configured to face the electrodes or inserted in the electrodes; and a memory layer disposed between the pillar electrode and the electrodes to memorize data based on the voltage of the word line and a voltage of the bit line.

Memory cells arranged in different rows may be electrically connected with mutually different word lines, respectively, and the pillar electrode may be shared between two memory cells arranged in an identical column and arranged in two adjacent rows.

A flat area or a diameter of the pillar electrode may vary in the vertical direction.

DETAILED DESCRIPTION

Figure 1:
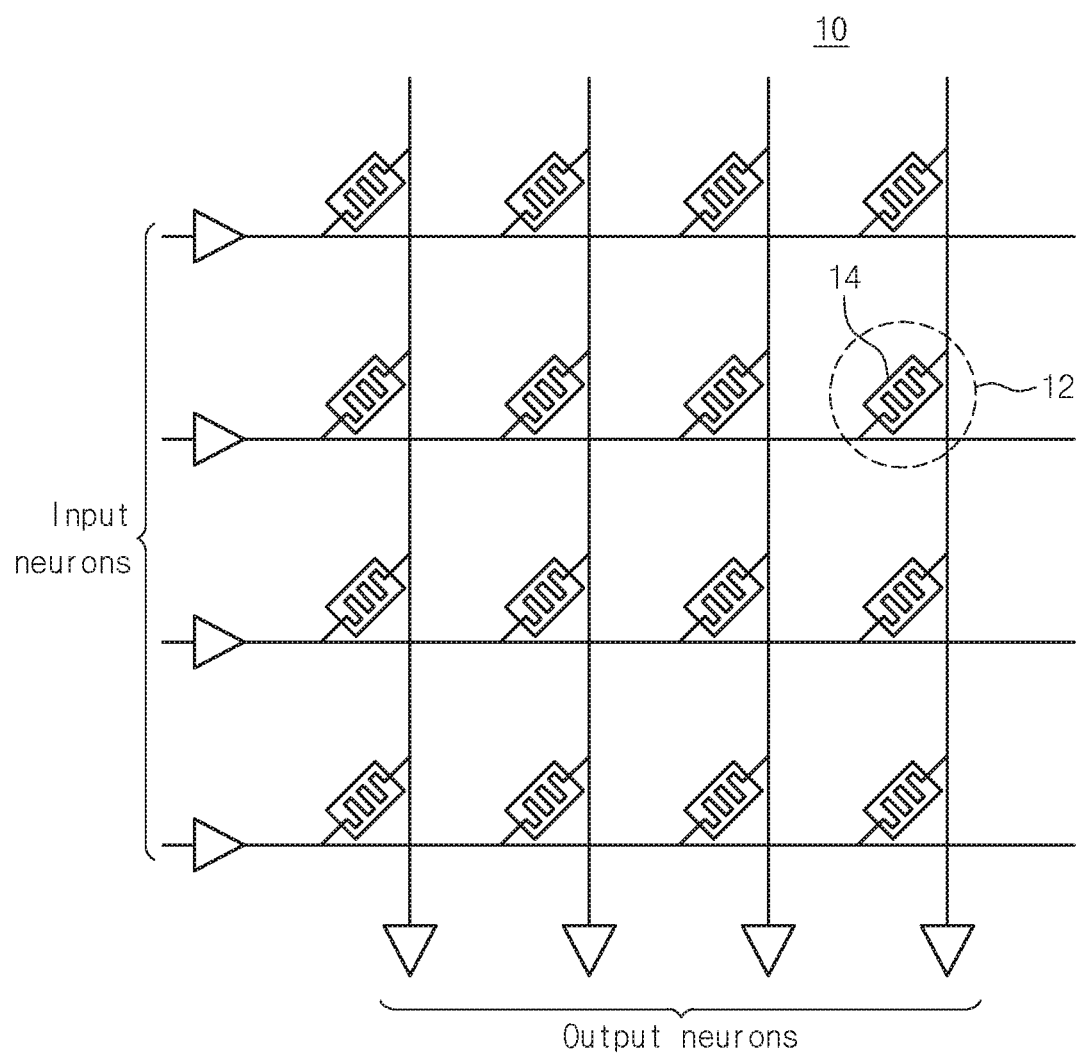
FIG. 1 is a view illustrating the configuration of a conventional neuromorphic system.
Figure 2:
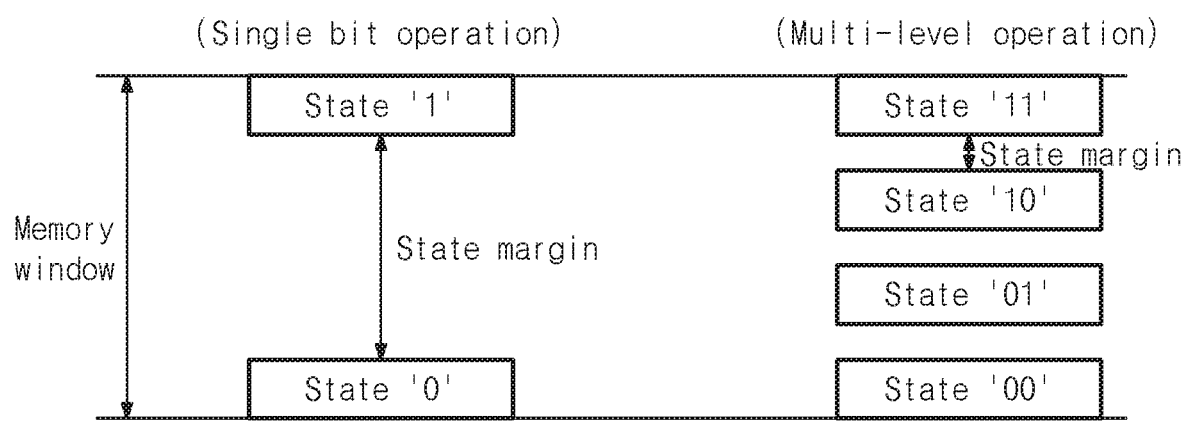
FIG. 2 is a view conceptually illustrating a state margin of a synapse unit constituting the conventional neuromorphic system.

Advantage points and features of the inventive concept and a method of accomplishing the same will become apparent from the following description with reference to the accompanying drawings. However, the inventive concept is not limited to embodiments disclosed in the following descriptions and may be defined by scope of the claims. Unless otherwise defined, all terms (including technical and scientific terms) used herein have the same meaning as commonly understood by one of ordinary skill in the art to which this inventive concept belongs. The general description of well-known elements will be omitted to render the subject matter of the inventive concept unclear. The same reference numerals will be assigned to the same elements through the drawings. A part of elements in drawings may be exaggerated, omitted, down-scaled or schematically drawn for the convenience or clarity of explanation.

The terminology in the subject application is only used to explain a specific embodiment, but the inventive concept is not limited thereto. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of features, numbers, steps, operations, elements, parts, or the combination thereof, but do not preclude the presence or addition of one or more other features, numbers, steps, operations, elements, parts, or the combination thereof.

The term "~unit" used throughout the whole present specification may refer to the unit of processing at least one function or operation, for example, may refer to software or a hardware element such as field programmable gate arrays (FPGAs) or application specific integrated circuits (ASICs). However, the term "~unit" is not limited to software or hardware. The part may be configured to be present in a storage medium to be addressed or may be configured to reproduce one or more processors.

For example, the unit may include elements, such as software elements, object-oriented software elements, class elements, or task elements, processes, functions, attributes, procedures, sub-routines, segments of program codes, drivers, firmware, micro-codes, circuit data, a database, data structures, tables, arrays, and variables. The functions provided by the elements and the part may be performed separately from a plurality of elements and parts and integrally with another additional element.

The neuromorphic system of the inventive concept has a feature in that a plurality of synapse elements are included in one synapse unit. According to the neuromorphic system of the inventive concept, input neurons may cross output neurons in the form of a cross-bar, and a synapse unit may be provided at each of interconnecting points between the input neurons and the output neurons and has a structure in which a plurality of synapse elements are connected with each other in parallel between one input neuron and one output neuron.

According to an embodiment of the inventive concept, each synapse unit is configured with a plurality of synapse elements connected with each other in parallel, thereby solving a problem that the state margin is narrowed when the multi-level operation is implemented, and thereby ensuring excellent characteristics in terms of stability. Accordingly, both of a multi-level operation and information retention or endurance may be satisfied.

In the neuromorphic system according to the embodiment of the inventive concept, pass transistors are connected with a plurality of synapse elements in series to control the transmission of input signals. In addition, the operations of the pass transistors are controlled by the controller to adjust the weight (conductance) of a synapse unit. In addition, the conductance of the synapse unit may be linearly controlled depending on the combination of conductances of a plurality of synapse elements, and the weight characteristic gradually and symmetrically varying may be obtained. In addition, conductances of the synapse elements connected with each other in parallel are intentionally differently designed such that the number of levels, which is able to be implemented through the synapse unit, is increased.

The neuromorphic system according to the embodiment of the inventive concept has a three dimensional (3D) stack structure of a plurality of synapse elements, thereby minimizing the whole area of the synapse array to ensure the high degree of integration while producing the above effects. The neuromorphic system according to the present embodiment may be applied to a computing system field based on hardware for the implementation of AI and may be used as a core technology of a system semiconductor field.

Figure 3:
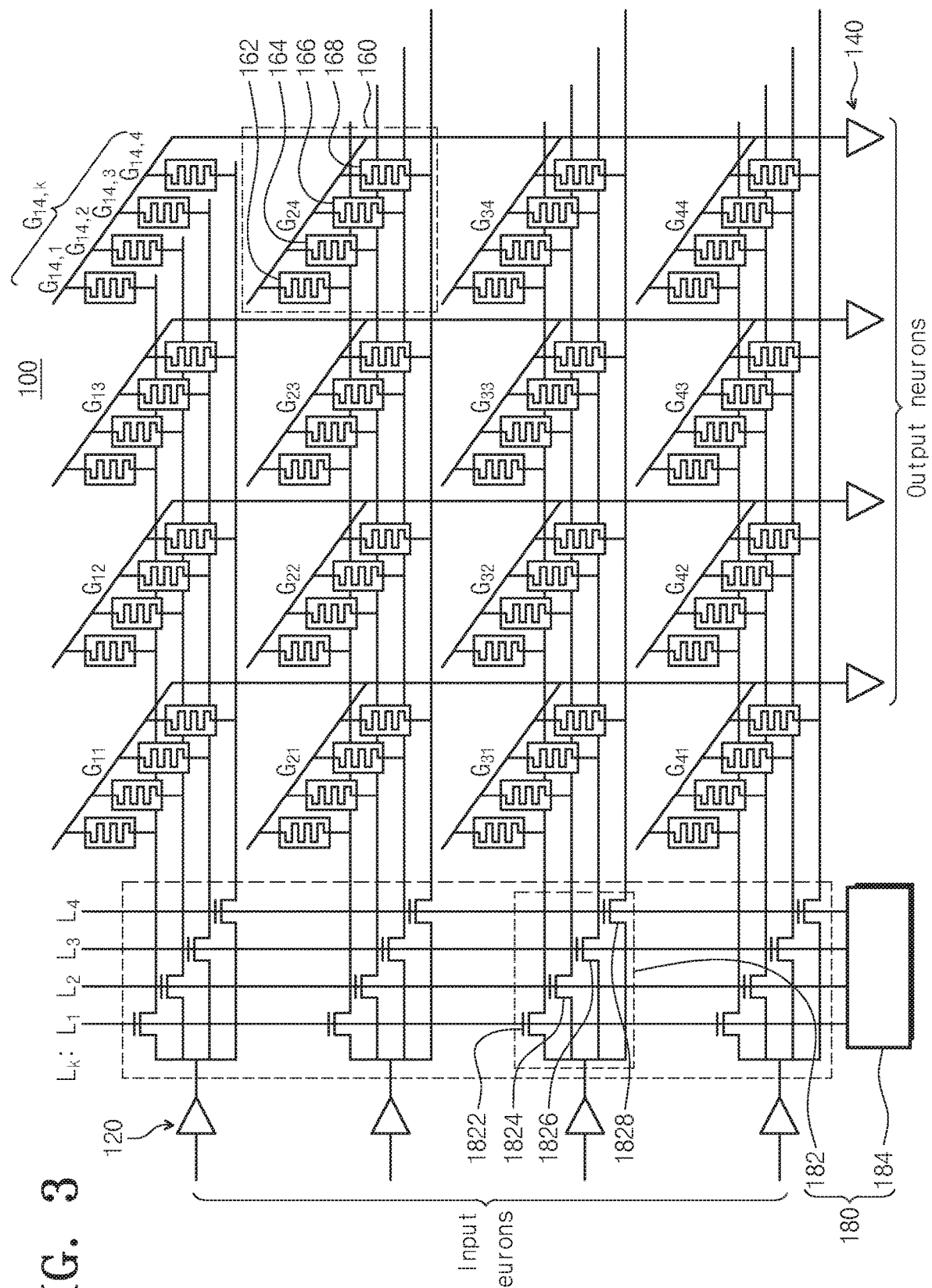
FIG. 3 is a view illustrating the configuration of a neuromorphic system, according to an embodiment of the inventive concept.

FIG. 3 is a plan view illustrating a neuromorphic system, according to an embodiment of the inventive concept. Referring to FIG. 3, according to an embodiment of the inventive concept, a neuromorphic system 100 includes input neurons 120, output neurons 140, a plurality of synapse units 160, and a selection unit 180.

The input neurons 120 provide input signals to the synapse units 160. The output neurons 140 provide output signals to the synapse units 160. For example, the input signals and the output signals may be signals provided for the learning of the synapse units 160. The input neuron 120 and the output neuron 140 are basic devices constituting the neuromorphic system 100 and well known in the art to which the inventive concept pertains. Accordingly, the details thereof will be omitted to prevent the subject matter of the inventive concept from becoming obscured.

The synapse unit 160 is provided at an interconnecting point, at which the input neuron 120 is connected with the output neuron 140, respectively. The synapse unit 160 connects any one of input neurons 120 with any one of output neurons 140. A plurality of synapse units 160 may be arranged in a lattice structure including a plurality of rows and a plurality of columns.

One-side terminals of the synapse units 160 arranged in the same row are electrically connected with one input neuron 120 to receive an input signal from the input neuron 120. One-side terminals of the synapse units 160 arranged in different rows are connected with mutually different input neurons 120. Opposite-side terminals of the synapse units 160 arranged in the same row are electrically connected with mutually different output neurons 140 in terms of an electrical signal.

One-side terminals of the synapse units 160 arranged in the same column are electrically connected with mutually different input neurons 120. Opposite-side terminals of the synapse units 160 arranged in the same column are electrically connected with one output neuron 140. Opposite-side terminals of the synapse units 160 arranged in the different columns are electrically connected with mutually different output neurons 140.

According to an embodiment of the inventive concept, each synapse unit 160 has, instead of a single synapse element, a structure in which a plurality of synapse elements 162, 164, 166, and 168 are connected in parallel to each other between the input neuron 120 and the output neuron 140.

According to an embodiment, the synapse elements 162, 164, 166, and 168 may be implemented with a resistive switching material (resistive switching memory), a phase change material, or other memory cells. For example, the synapse element may employ devices such as a static random access memory (SRAM) element, a floating-gate (FG) memory element, or memristors based on next-generation memories such as a resistive random access memory (RRAM), a phase-change random access memory (PRAM), and a magnetic random access memory (MRAM).

The selection unit 180 is connected between the input neuron 120 and the synapse unit 160. The selection unit 180 selects at least one synapse element, which is to transmit an input signal, of the plurality of synapse elements 160 with respect to each of the synapse units 160 to adjust a conductance (weight) of the synapse unit 160. The total conductance (weight) of the synapse unit 160 may be determined as being the sum of conductances ($G_{xy,k}$) of the synapse elements as expressed in Equation 1.

$$G_{xy} = \Sigma_{k=1}^{n} G_{xy,k} (k; \text{layer number}) \qquad \text{Equation 1}$$

In Equation 1, $G_{xy}$ (x denotes an input neuron number and y denotes an output neuron number) represents the total conductance of the synapse unit 160 provided at the interconnecting point in which an $x^{th}$ input neuron is connected with a $y^{th}$ output neuron, and 'n' represents the number of synapse elements constituting the synapse unit 160 and connected with each other in parallel. $G_{xy,k}$ (k=1,2, . . . , and n) represents a conductance of a $k^{th}$ synapse element among n synapse elements, which are connected with each other in parallel, of the synapse unit provided at the interconnecting point of the $x^{th}$ input neuron and the $y^{th}$ output neuron.

According to an embodiment, although FIG. 3 illustrates that x=4, y=4, and n=4 are provided only for the illustrative purpose, the neuromorphic system of the inventive concept is not limited thereto. For example, the number of the input neurons, the number of the output neurons, and the number of synapse elements constituting each synapse unit may be variously changed.

The selection unit 180 is provided to individually operate the synapse elements 160. According to an embodiment, the selection unit 180 may include a plurality of transistor units 182 and a controller 184. The transistor unit 182 may be connected between the input neuron 120 and the synapse unit 160. The transistor unit 182 may include pass transistors 1822, 1824, 1826, and 1828 equal to the synapse elements 162, 164, 166, and 168 constituting the synapse unit 160 in number.

The transistor unit 182 may be provided for each input neuron 120. Accordingly, the selection unit 180 includes pass transistors in number corresponding to a multiplication of the number of the input neurons 120 and the number of the synapse elements 162, 164, 166, and 168 constituting the synapse unit 160.

The pass transistors 1822, 1824, 1826, and 1828 of the transistor unit 182 are connected with the synapse elements 162, 164, 166, and 168, respectively, in series. The pass transistors 1822, 1824, 1826, and 1828 transmit an input signal, which is to be applied to the input neuron 120, to the synapse elements 162, 164, 166, and 168, respectively, in response to a control signal from the controller 184.

The controller 184 may adjust the weight (conductance) of the synapse unit 160 by controlling the operations of the pass transistors 1822, 1824, 1826, and 1828. The controller 184 selectively turns on/off the transistors 1822, 1824, 1826, and 1828 to adjust the conductance of the synapse unit 160 and to adjust the weight.

The controller 184 may turn on/off the pass transistors 1822, 1824, 1826, and 1828 through control lines $L_1$, $L_2$, $L_3$, and $L_4$. The first control line $L_1$ is connected with gate terminals of first pass transistors 1822 connected with mutually different input neurons 120 to simultaneously turn on or off the first pass transistors 1822. Similarly, the second to fourth control lines L2, L3, and L4 may simultaneously turn on or off the second to fourth pass transistors 1824 to 1828, respectively.

The conductance of the synapse unit 160 may be determined as the sum of conductances of synapse elements connected with turned-on pass transistors. Therefore, according to the embodiment of the inventive concept, the conductance of the synapse unit 160 may be variously changed by turning on/off the pass transistors.

If the output neuron outputs a signal (firing) in response to the input signal from the input neuron, the learning of the synapse unit (a plurality of synapse elements) connected with the input neuron and the output neuron may occur. In this case, the learning occurs only in the synapse element, the pass transistor of which is activated.

FIGS. 4 to 7 are plan views illustrating a learning procedure, according to an embodiment of the inventive concept. FIGS. 4 to 7 illustrate the case that control lines $L_1$, $L_2$, $L_3$, and $L_4$ are sequentially selected, according to an embodiment. Referring to FIGS. 4 to 7, when the control line $L_k$ (k=1, 2, 3, and 4) is selected by the controller 184, 16 synapse elements corresponding to a layer number k (k=1, 2, 3, and 4) are connected between input neurons 120 and the output neurons 140.

Figure 4:
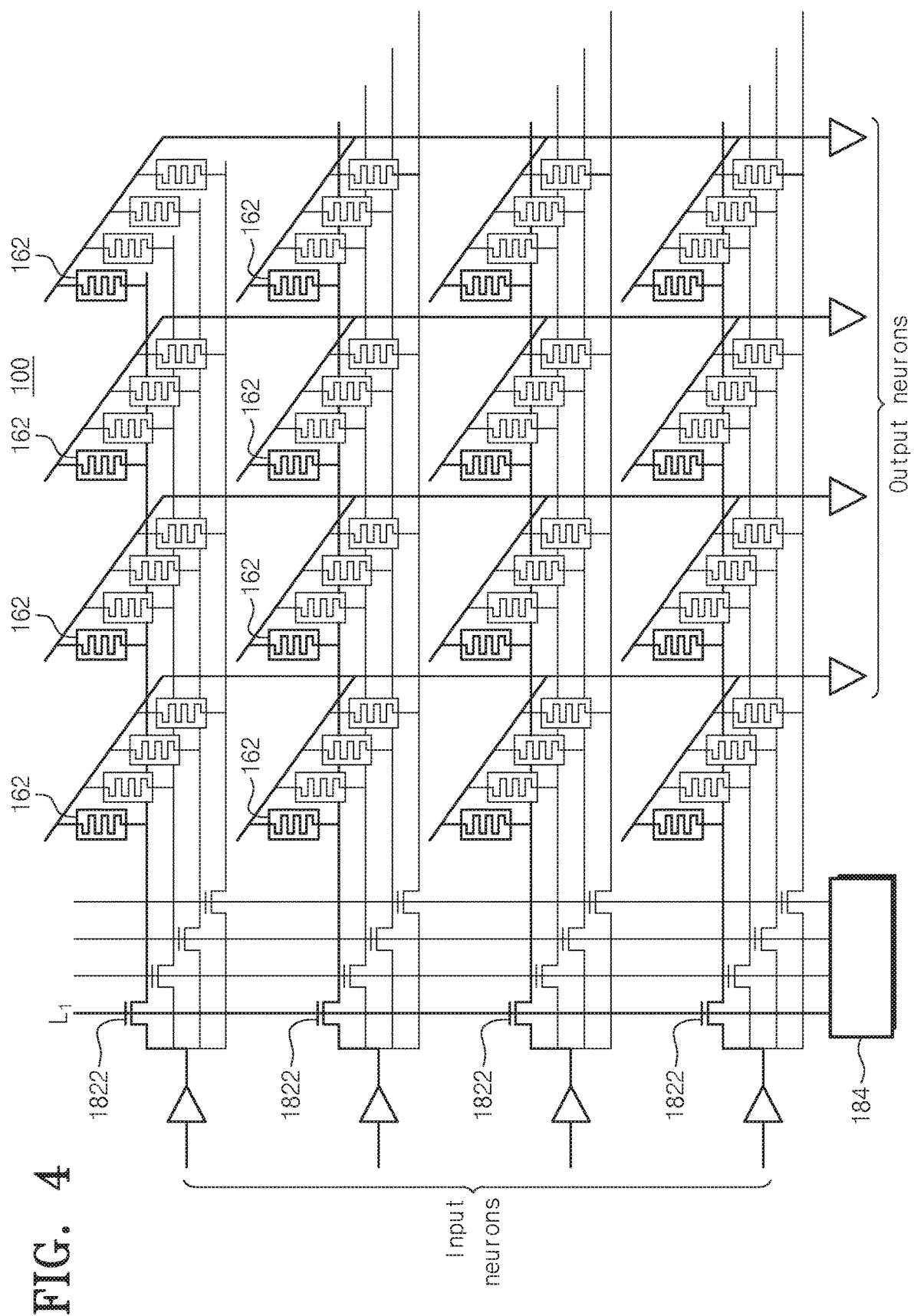
FIGS. 4 to 7 are views illustrating a learning procedure, according to an embodiment of the inventive concept.
Figure 5:
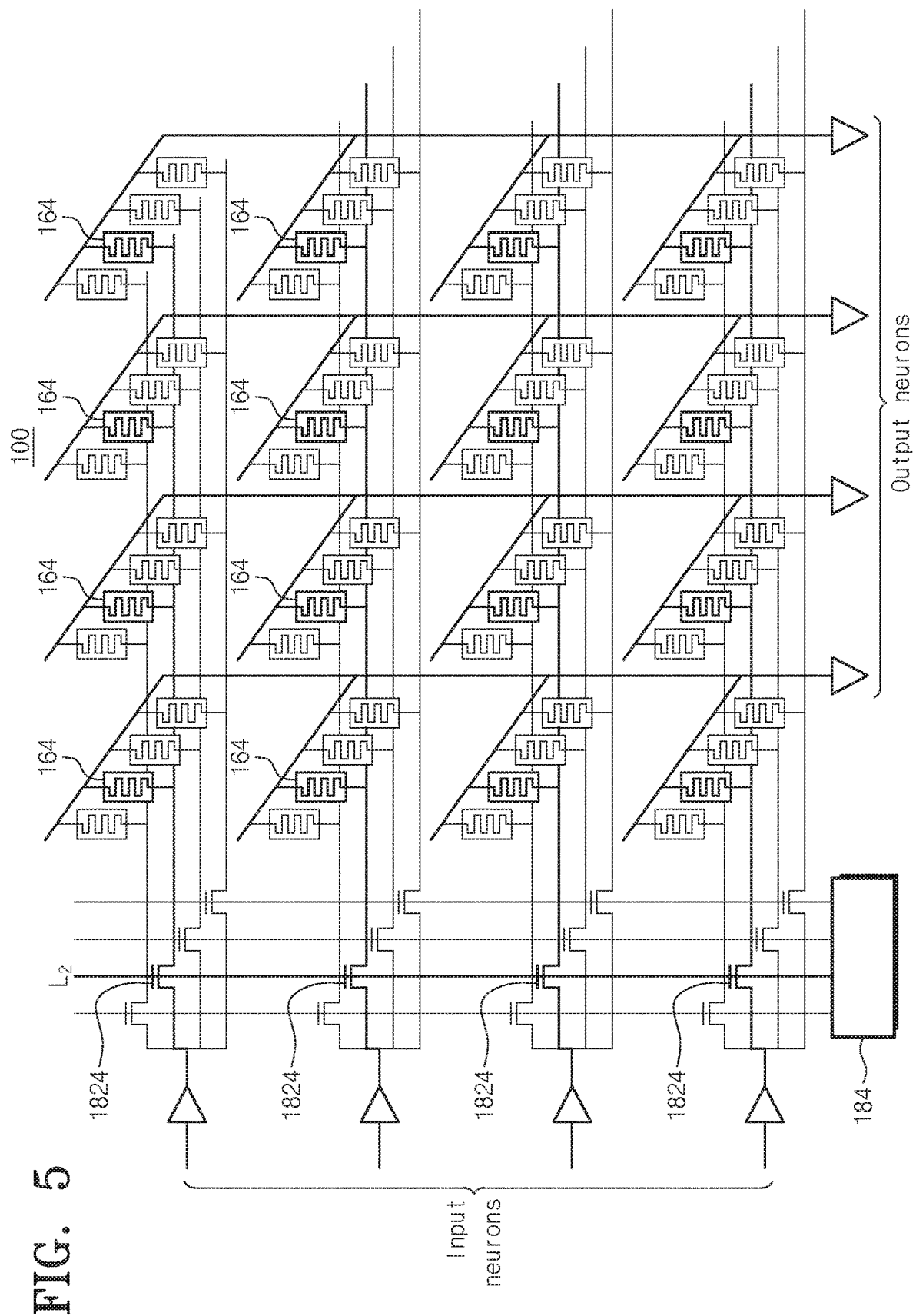
Figure 6:
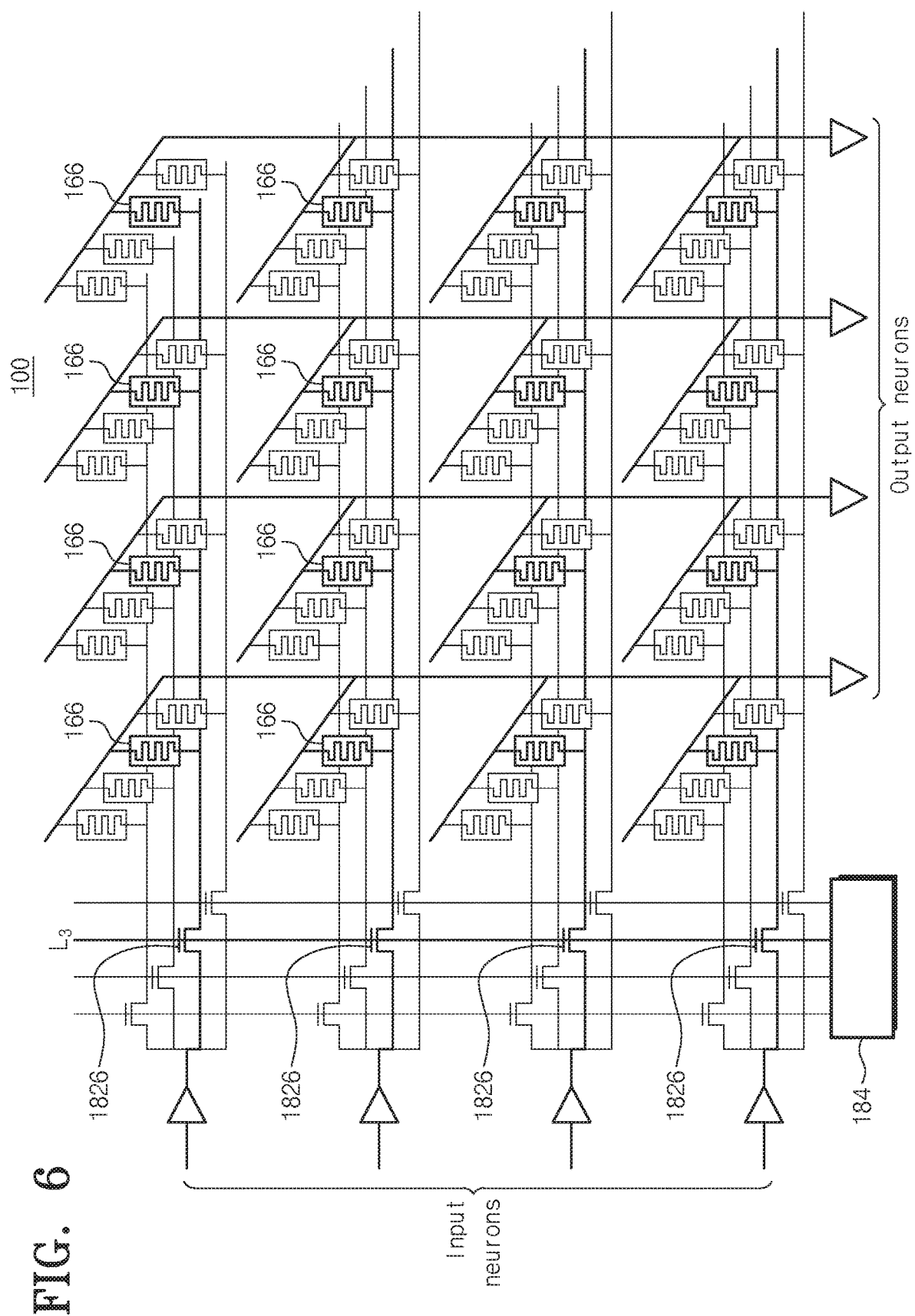
Figure 7:
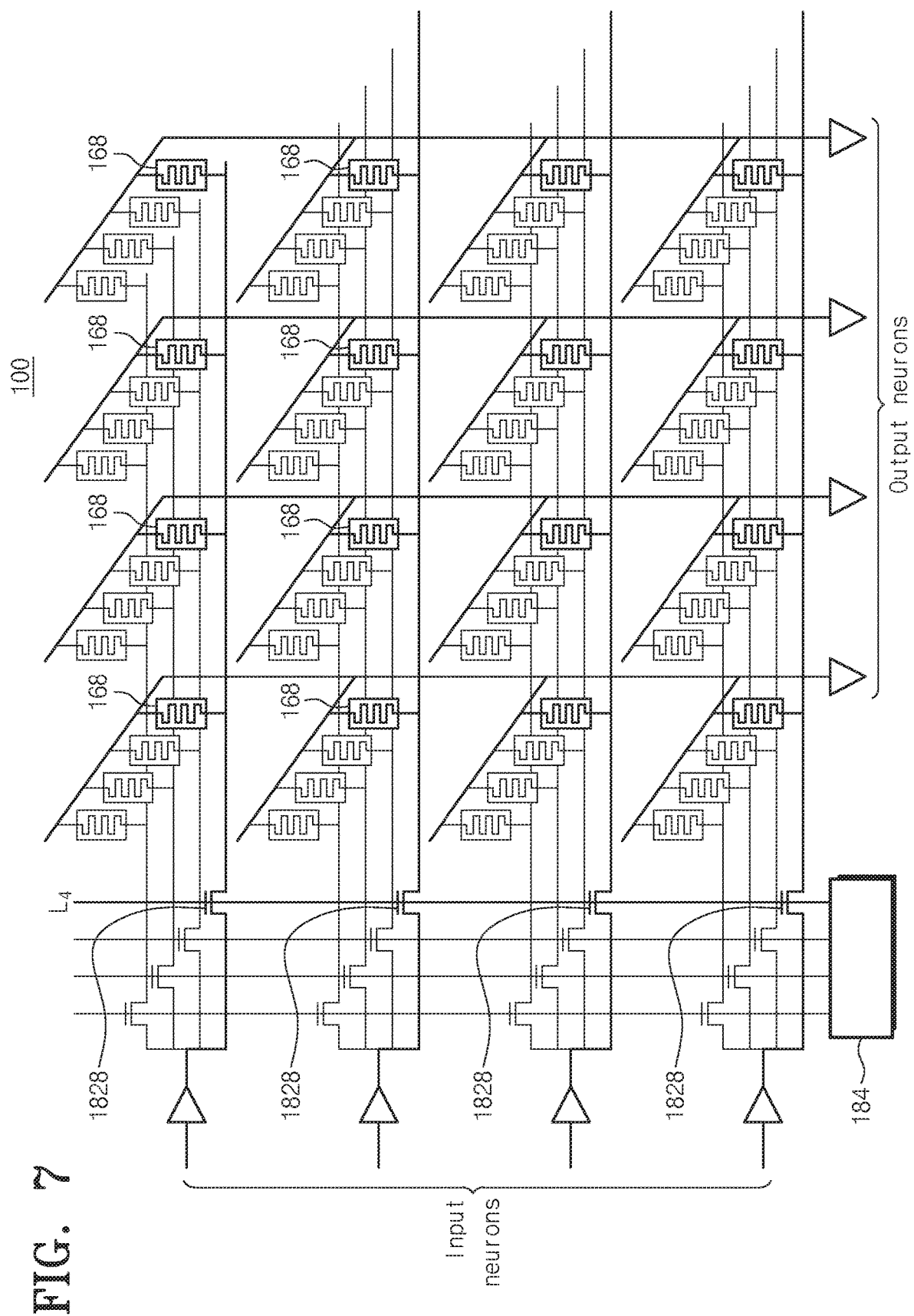

Referring to FIG. 4, if a control signal is applied to a gate terminal of first pass transistors 1822 through the control line $L_1$, all synapse elements 162 on the 2D array are simultaneously connected and subject to parallel process computations. An AI learning operation of the synapse array may be sequentially performed for each layer, or a plurality of synapse elements may be simultaneously learned by simultaneously selecting a plurality of layers.

Figure 8:
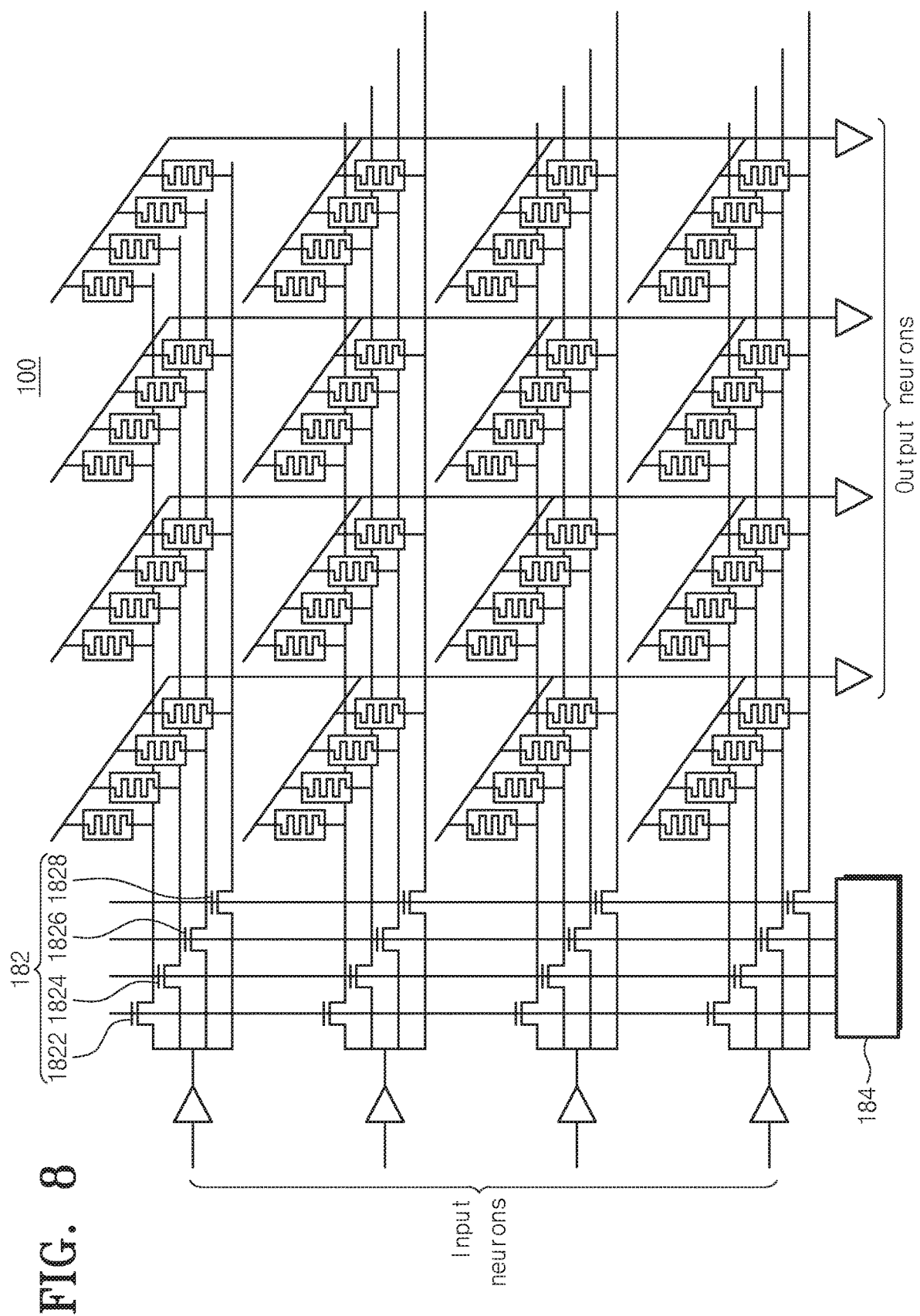
FIG. 8 is a view illustrating a read operation and a verify operation of the neuromorphic system, according to an embodiment of the inventive concept.

FIG. 8 is a view illustrating a read operation and a verify operation of the neuromorphic system, according to an embodiment of the inventive concept. As illustrated in FIG. 8, the read/verify operation of the whole synapse array may be performed in the state that all layers are selected by the controller 184. In this case, the conductance ($G_{xy}$) of the synapse unit 160 at each interconnecting point may be expressed as the sum of conductances ($G_{xy,k}$) of synapse elements at each layer.

Figure 9:
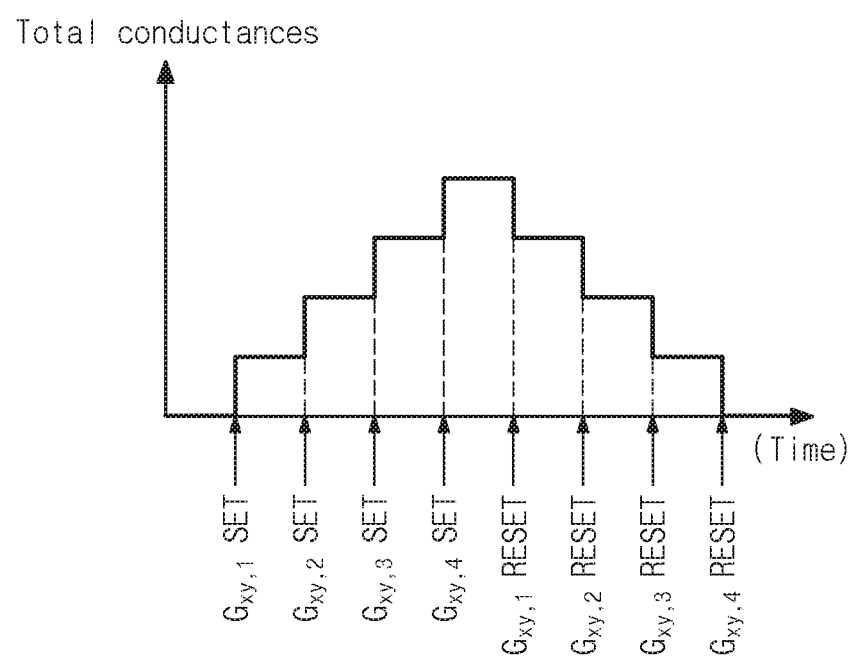
FIG. 9 is a graph illustrating the variation in a conductance of a synapse unit constituting a neuromorphic system, according to an embodiment of the inventive concept.

FIG. 9 is a graph illustrating the variation in a conductance of a synapse unit constituting the neuromorphic system, according to an embodiment of the inventive concept. According to an embodiment of the inventive concept, pass transistors are controlled to sequentially select synapse elements connected between an input neuron and an output neuron such that the synapse elements are operated according to layers. Therefore, as illustrated in FIG. 9, a SET operation (of increasing the conductance) and a RESET operation (of decreasing the conductance) are linearly controlled and gradually and symmetrically control the weight (the conductance) with accuracy. Accordingly, the whole performance of the AI may be improved.

According to the present embodiment, each synapse element may perform a single-bit operation while the synapse unit 160 may implement a multi-level operation as a whole. Accordingly, the excellent reliability of the single bit operation may be represented in retention or endurance, and the multi-level operation may be implemented.

Figure 10:
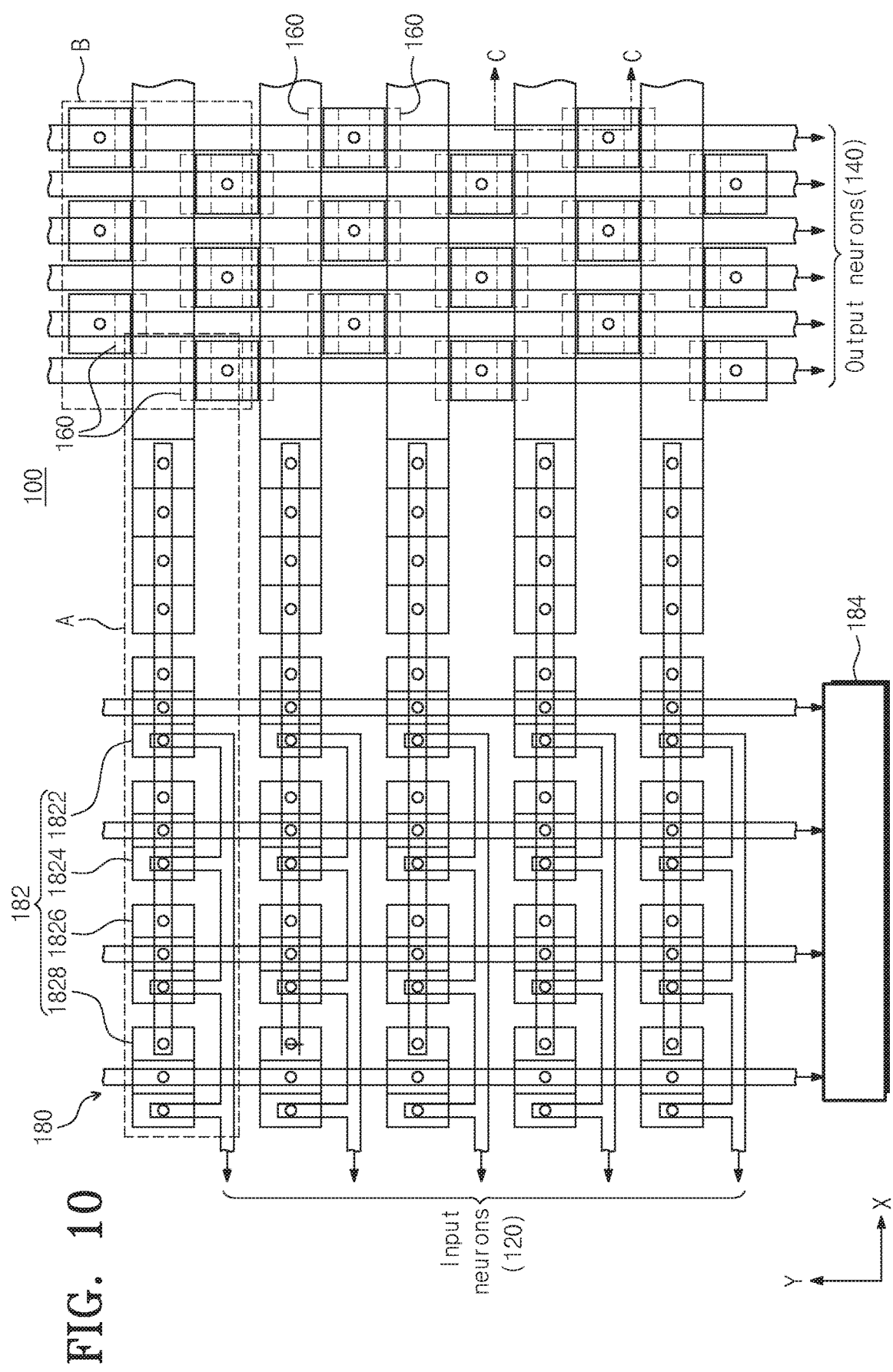
FIG. 10 is a plan view illustrating a neuromorphic system, according to an embodiment of the inventive concept.
Figure 11:
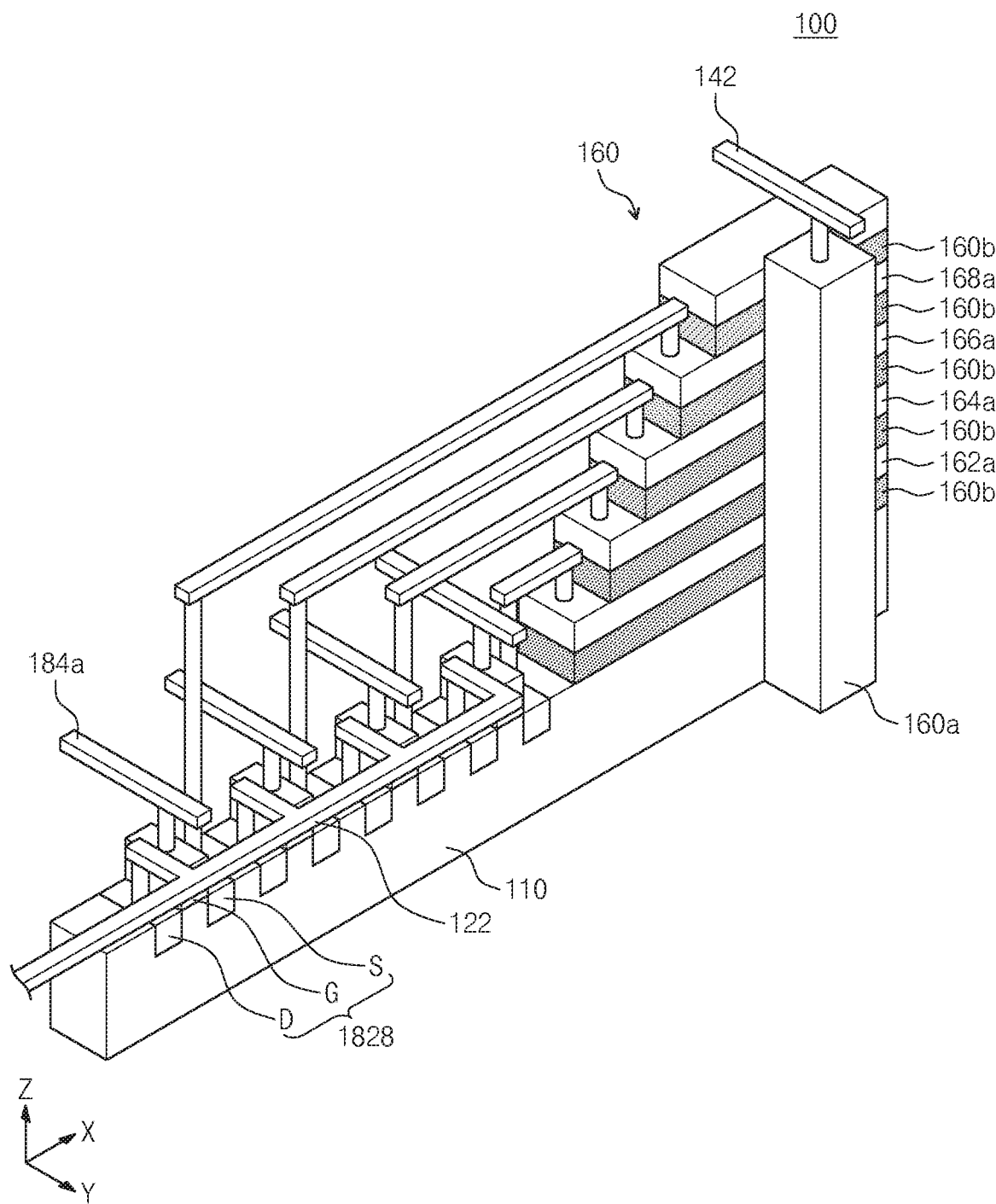
FIG. 11 is an enlarged perspective view of part 'A' of FIG. 10.
Figure 12:
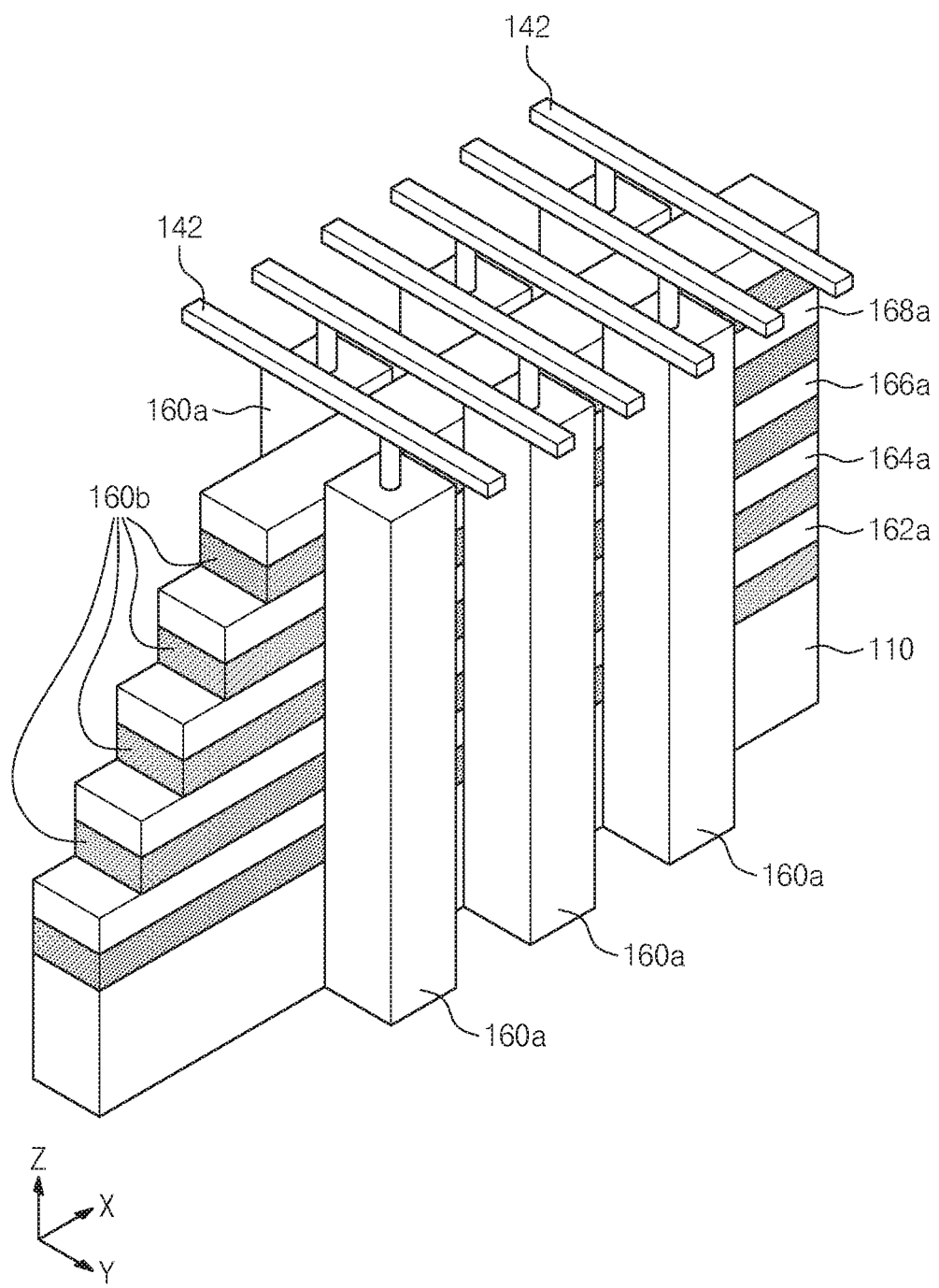
FIG. 12 is an enlarged perspective view of part 'B' of FIG. 10.
Figure 13:
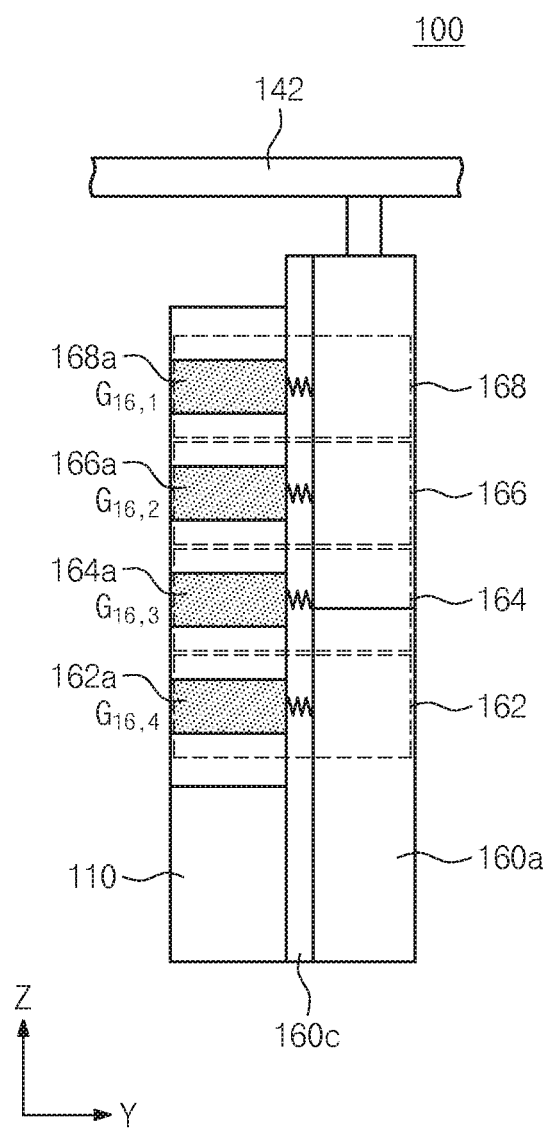
FIG. 13 is a sectional view taken along line C-C of FIG. 10.

FIG. 10 is a plan view illustrating a neuromorphic system, according to an embodiment of the inventive concept. FIG. 11 is an enlarged perspective view of part 'A' of FIG. 10. FIG. 12 is an enlarged perspective view of part 'B' of FIG. 10. FIG. 13 is a sectional view taken along line C-C of FIG. 10. According to an embodiment described with reference to FIGS. 10 to 13, five input neurons and six output neurons are provided.

Referring to FIGS. 10 to 13, to minimize the increase in a whole array area as a plurality of synapse elements are arranged at each interconnecting point of the synapse array, the synapse elements 162, 164, 166, and 168 are provided in a 3D up-down stack structure. In other words, the synapse elements 162, 164, 166, and 168 are produced in a parallel-stack form, thereby minimizing the addition in the array area as the synapse unit 160 is implemented with the synapse elements 162, 164, 166, and 168.

Referring to FIG. 11, each of the pass transistors 1822, 1824, 1826, and 1828 provided to adjust the weight (conductance) of the synapse unit 160 may include a drain terminal D, a source terminal S, a channel layer (not illustrated), and a gate terminal G which is insulated. Although FIG. 11 illustrates that the pass transistor is formed in a top gate structure, the pass transistor may have a bottom gate structure.

An input signal may be applied from the input neuron to the drain terminal D of each of the pass transistors 1822, 1824, 1826, and 1828 through an input line 122. Source terminals S of the pass transistors 1822, 1824, 1826, and 1828 are connected with electrodes 162a, 164a, 166a, and 168a of the synapse elements 162, 164, 166, and 168. A control signal of the controller 184 may be input to the gate terminal G of each of the pass transistors 1822, 1824, 1826, and 1828 through a control signal line 184a.

According to an embodiment, the synapse elements 162, 164, 166, and 168 may include a pillar electrode 160a, the electrodes 162a, 164a, 166a, 168a, and a resistive switching layer 160c. The pillar electrode 160a may be provided in a stack direction (vertical direction) of the synapse elements 162, 164, 166, and 168. Output signals may be applied to the pillar electrode 160a from the output neurons 140 through an output line 142.

The electrodes 162a, 164a, 166a, and 168a are formed on a substrate 110 to face the pillar electrode 160a while interposing the resistive switching layer 160c between the electrodes 162*a*, 164*a*, 166*a*, and 168*a* and the pillar electrode 160*a*. The electrodes 162*a*, 164*a*, 166*a*, and 168*a* are formed while being spaced apart from each other in a direction in which the synapse elements 162, 164, 166, and 168 are stacked. The electrodes 162*a*, 164*a*, 166*a*, and 168*a* may be insulated from each other by insulating layers 160*b*. According to an embodiment, the electrodes 162*a*, 164*a*, 166*a*, and 168*a* may include metal or doped semiconductors, but the inventive concept is not limited thereto.

The resistive switching layer 160*c* may be interposed between the pillar electrode 160*a* and the electrodes 162*a*, 164*a*, 166*a*, and 168*a*. According to an embodiment, the resistive switching layer 160*c* may include a material (for example, a metallic oxide) allowing the switching in resistance according to an input signal provided from the input neuron and an output signal provided from the output neuron.

Pillar electrodes 160*a* may be provided in the form of a checker board to reduce the whole array size. In addition, the pillar electrode 160*a* may be shared between synapse units arranged in adjacent two rows and arranged in the same column. In other words, one pillar electrode 160*a* is shared between two adjacent row directional lines (x), thereby forming the synapse units 160 in a more compact size and thereby increasing the degree of the integration of a semiconductor device (the connection number of synapse elements in the same area).

According to an embodiment, on the assumption that one synapse element is able to have a conductance value of 0 or G, and k synapse elements, which are stacked, have the same characteristics (conductance values), multi-level conductance values to be implemented in the synapse unit 160 are changeable to 0, G, 2G, 3G, . . . , and kG. Accordingly, multi-levels of k+1 may be implemented in total in the synapse unit 160.

Figure 14:
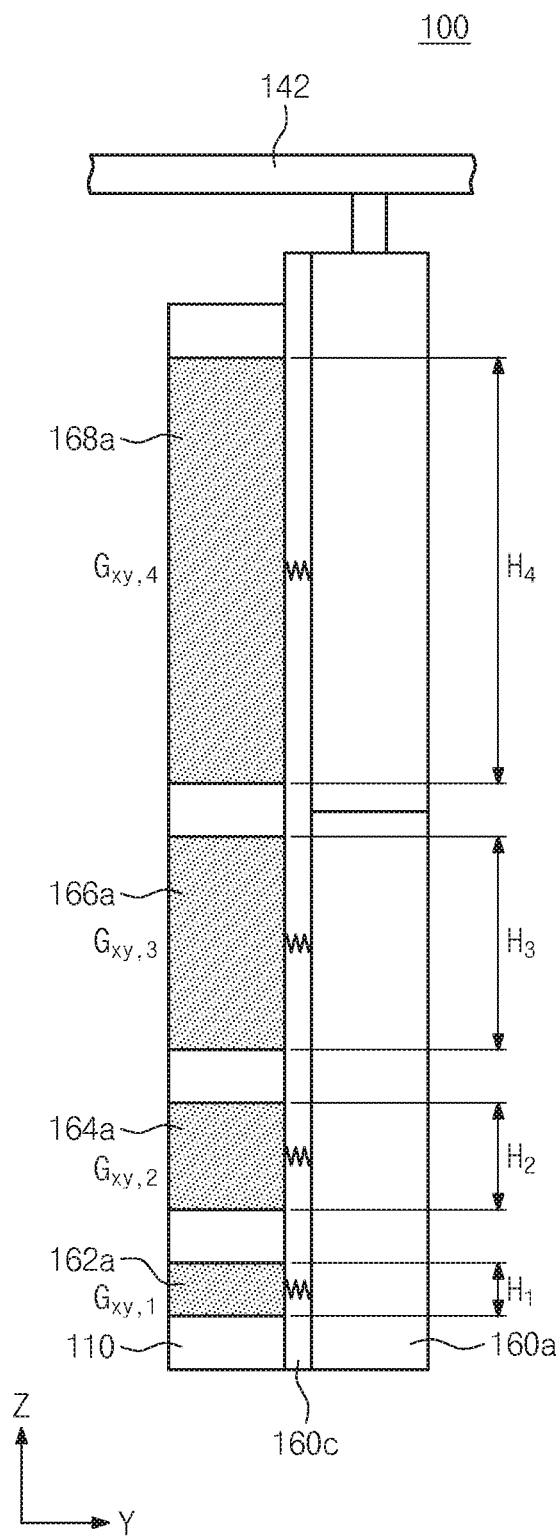
FIG. 14 is a view illustrating that conductances of the synapse elements constituting the neuromorphic system according to an embodiment of the inventive concept are designed with different values.

FIG. 14 is a view illustrating that conductances of the synapse elements constituting the neuromorphic system according to an embodiment of the inventive concept are designed with different values. According to an embodiment, the synapse elements may be provided such that each of the conductances is doubly increased. In the case that conductances of the synapse elements are doubly increased in an ON operation, the synapse unit 160 may implement the total of $2^k$ multi-levels through k synapse elements connected in parallel.

In the case that the synapse elements constituting the synapse unit 160 have different characteristics, even if the synapse elements are activated in equal number, the synapse unit may have different levels depending on the characteristic (conductances) of the synapse elements which are activated. Accordingly, more multi-levels may be implemented when comparing with the case that the synapse elements have the same characteristics. Accordingly, the synapse elements are implemented with mutually different characteristics, thereby implementing more multi-levels through a smaller number of synapse elements (a smaller stack number).

The conductances of the synapse elements may be adjusted by intentionally differently designing the structures (sizes, materials, shapes, or the like) of the synapse elements. A method of designing the conductance of the synapse element may be varied with the type of the synapse element. When the synapse element is implemented with a flash memory, the conductance of the synapse element may be adjusted by adjusting the channel width of the transistor. When the synapse element is implemented with a resistive switching material, thicknesses H1, H2, H3, and H4, widths, or the composition ratios are changed to adjust the characteristic of the synapse element.

The channel width of the pass transistor may correspond to the conductance of the synapse element connected with the pass transistor. Accordingly, when the conductances of the synapse elements, which are connected with each other in parallel, are designed with mutually different values, the channel widths of the pass transistors may be designed with mutually different values. The pass transistors may be designed to allow current to flow with the maximum intensity or more in the sum of intensities of current flowing through the synapse elements.

As described above, according to an embodiment of the inventive concept, both of the multi-level operation and the information retention may be satisfied, and the weight of the synapse unit may be gradually and symmetrically changed. In addition, the number of levels to be implemented by the synapse unit may be increased while the degree of the integration of a semiconductor device may be increased.

Figure 15:
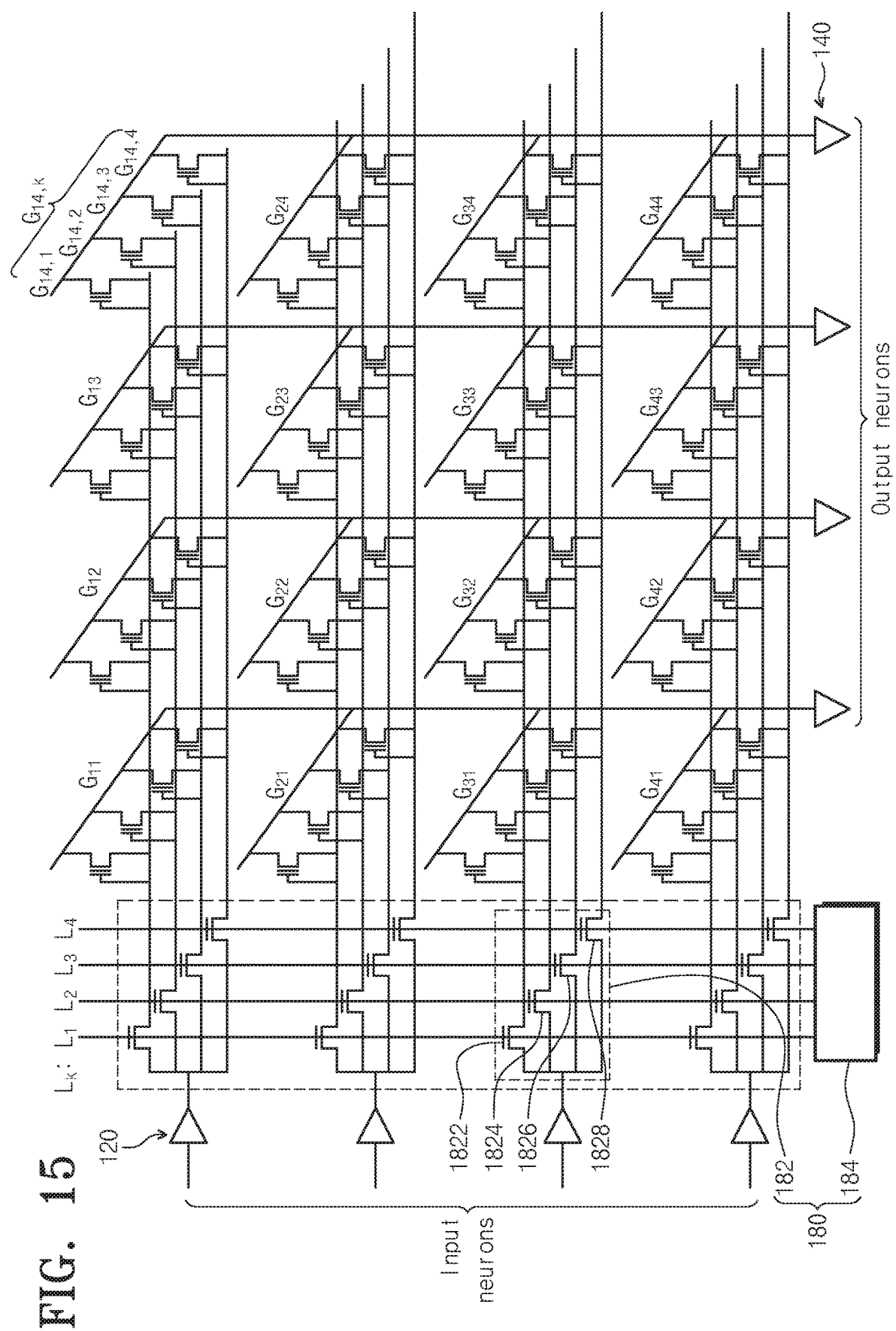
FIG. 15 is a view illustrating a neuromorphic system, according to another embodiment of the inventive concept.

FIG. 15 is a view illustrating a neuromorphic system, according to another embodiment of the inventive concept. As illustrated in FIG. 15, the synapse element may be provided in the form of a flash memory cell which is a three-terminal device, in addition to a memristor including a resistive switching material or a phase change material. In this case, a drain and a gate of the flash memory cell are bound to implement the synapse element.

Figure 16:
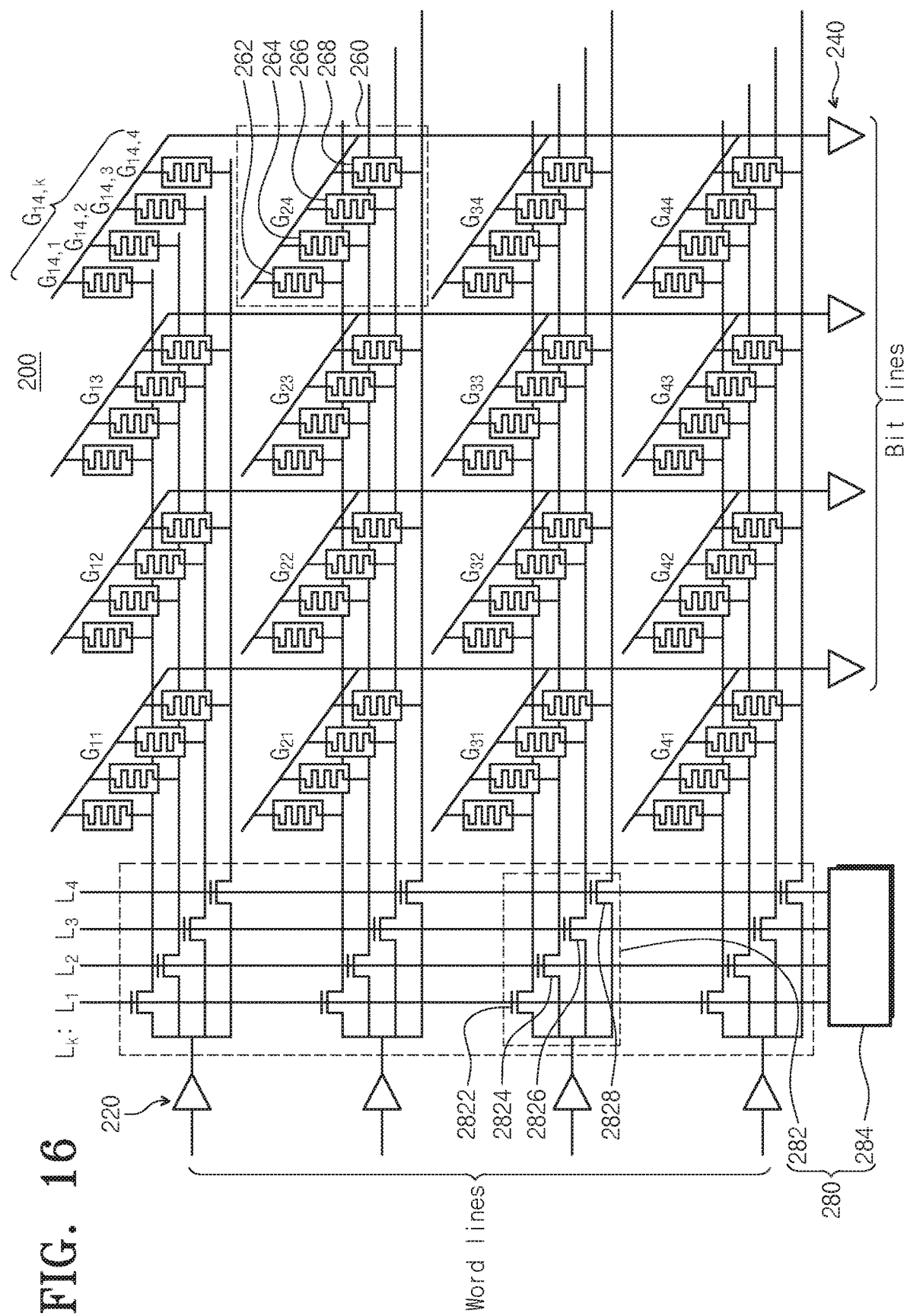
FIG. 16 is a view illustrating the configuration of a memory device, according to an embodiment of the inventive concept.

FIG. 16 is a view illustrating the configuration of a memory device, according to an embodiment of the inventive concept. A memory device 200 of FIG. 16 according to the embodiment may be provided in the same structure as that of the neuromorphic system 100 or the structure similar to that the neuromorphic system 100. According to the present embodiment, the memory deice 200 has a difference from the neuromorphic system 100 according to previous embodiments described above in that word lines 220 and bit lines 240 are provided instead of the input neurons and the output neurons of the neuromorphic systems 100, respectively.

Similarly to the neuromorphic system 100, in the memory device 200 according to an embodiment of the inventive concept, a memory cell 260 is provided at the interconnecting point between the word line 220 and the bit line 240 and is provided in the structure in which a plurality of memory elements 262, 264, 266, and 268 are stacked in parallel.

In addition, a memory cell may be provided in a vertical direction and may include a pillar electrode connected with the bit line, electrodes facing the pillar electrode, spaced apart from each other in the vertical direction, and connected with the word lines, and a memory layer (corresponding to the resistive switching layer of the neuromorphic system) disposed between the pillar electrode and the electrodes to memorize data according to the voltage of the word line and the voltage of the bit line.

In addition, a selection unit 280 is connected between the word line 220 and memory cells 260 arranged in the same row. The selection unit 280 selects at least one memory element, which is to transmit a voltage applied to the word line 220, of a plurality of memory elements 262, 264, 266, and 268. To this end, the selection unit 280 may include a transistor unit 282 including pass transistors 2822, 2824, 2826, and 2828 connected with the memory elements 262, 264, 266, and 268 in series, and a controller 284 to control the operations of the pass transistors 2822, 2824, 2826, and 2828.

A 3D stack structure of the memory device 200 according to the present embodiment may be understood by making reference to the embodiments of the neuromorphic system 100 described above, and thus the details thereof will be omitted. According the memory device 200 of the present embodiment, multi-level data may be memorized in one memory cell, information retention may be enhanced, and the degree of the integration of the semiconductor device may be enhanced.

Figure 17:
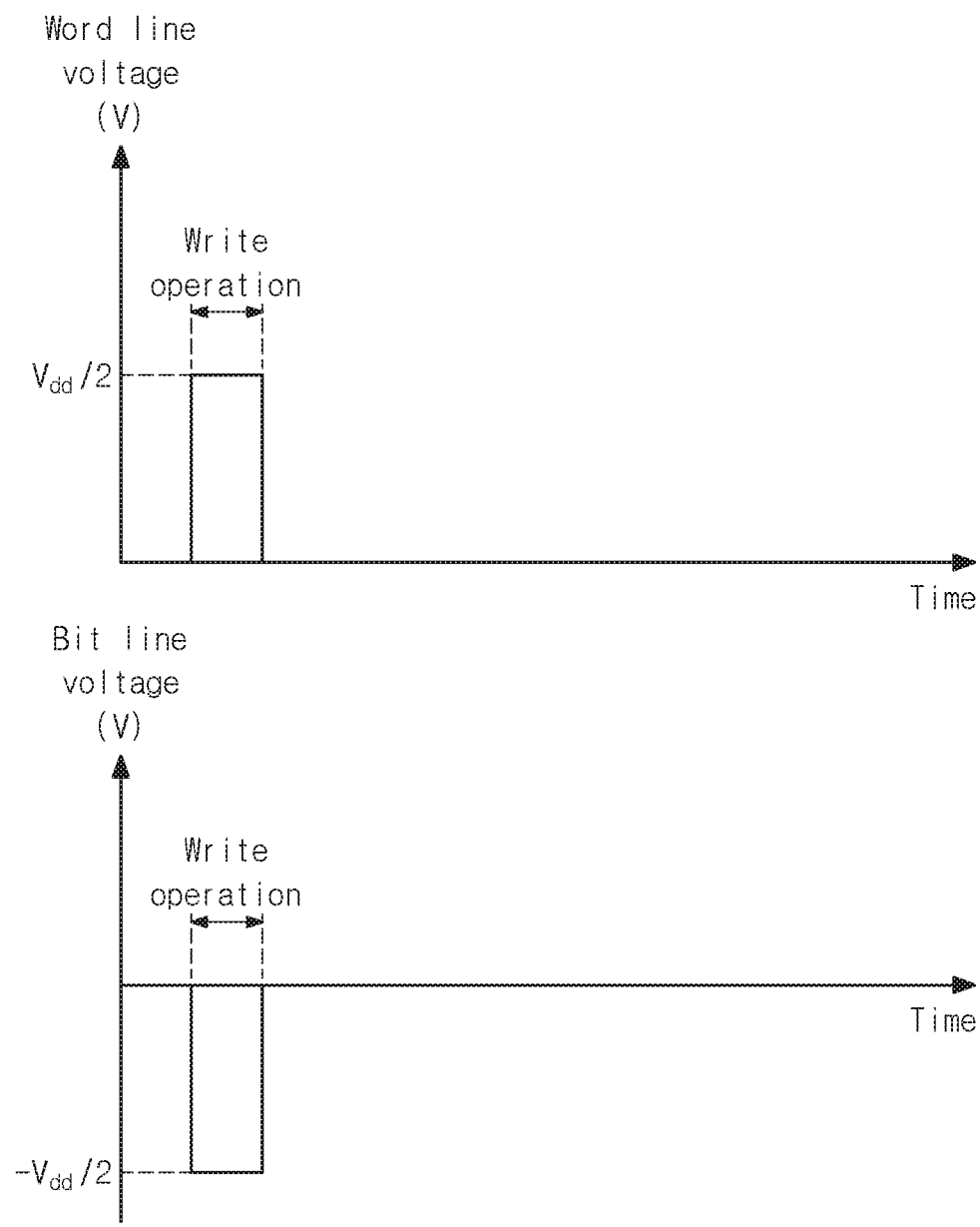
FIG. 17 is a graph illustrating a writing operation of a memory device, according to an embodiment of the inventive concept.
Figure 18:
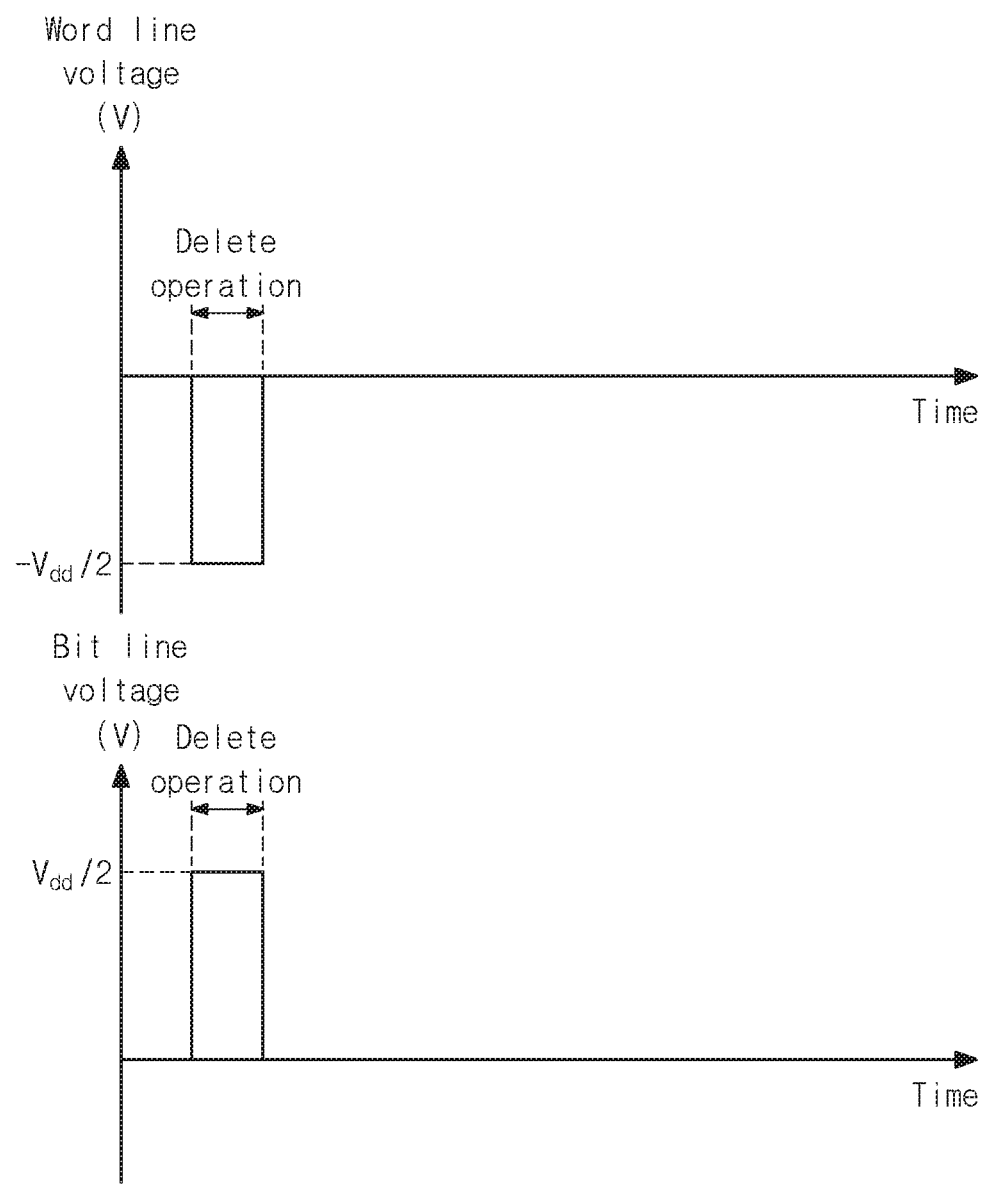
FIG. 18 is a graph illustrating a delete operation of a memory device, according to an embodiment of the inventive concept.

FIG. 17 is a graph illustrating a write operation of a memory device, according to an embodiment of the inventive concept. According to an embodiment, the voltages of $V_{dd}/2$ and $-V_{dd}/2$ are applied to a word line and a bit line connected with a memory element for data writing, respectively, and thus the voltage of $V_{dd}$ is applied across both terminals of the memory element, thereby performing the write operation. In the case of remaining memory elements, which are not subject to the write operation, since the voltage of 0V is applied to bit lines or word lines thereof, a voltage across both terminals becomes $V_{dd}/2$ or less. Accordingly, the write operation is not performed with respect to the remaining memory devices FIG. 18 is a graph illustrating a delete operation of a memory device, according to an embodiment of the inventive concept. In the data delete operation, the voltages of $-V_{dd}/2$ and $V_{dd}/2$ is applied to the word lie and the bit line connected with the memory element to be subject to the delete operation, respectively, and thus the voltage of $-V_{dd}$ is applied across both terminals of the memory device. In the case of remaining memory elements, which are not subject to the delete operation, other than the memory element to be subject to the delete operation, since the voltage of 0V is applied to the bit line or the word line, the voltage across both terminals of the memory element is $V_{dd}/2$ or less. Accordingly, the delete operation is not performed with respect to the remaining memory elements.

Figure 19:
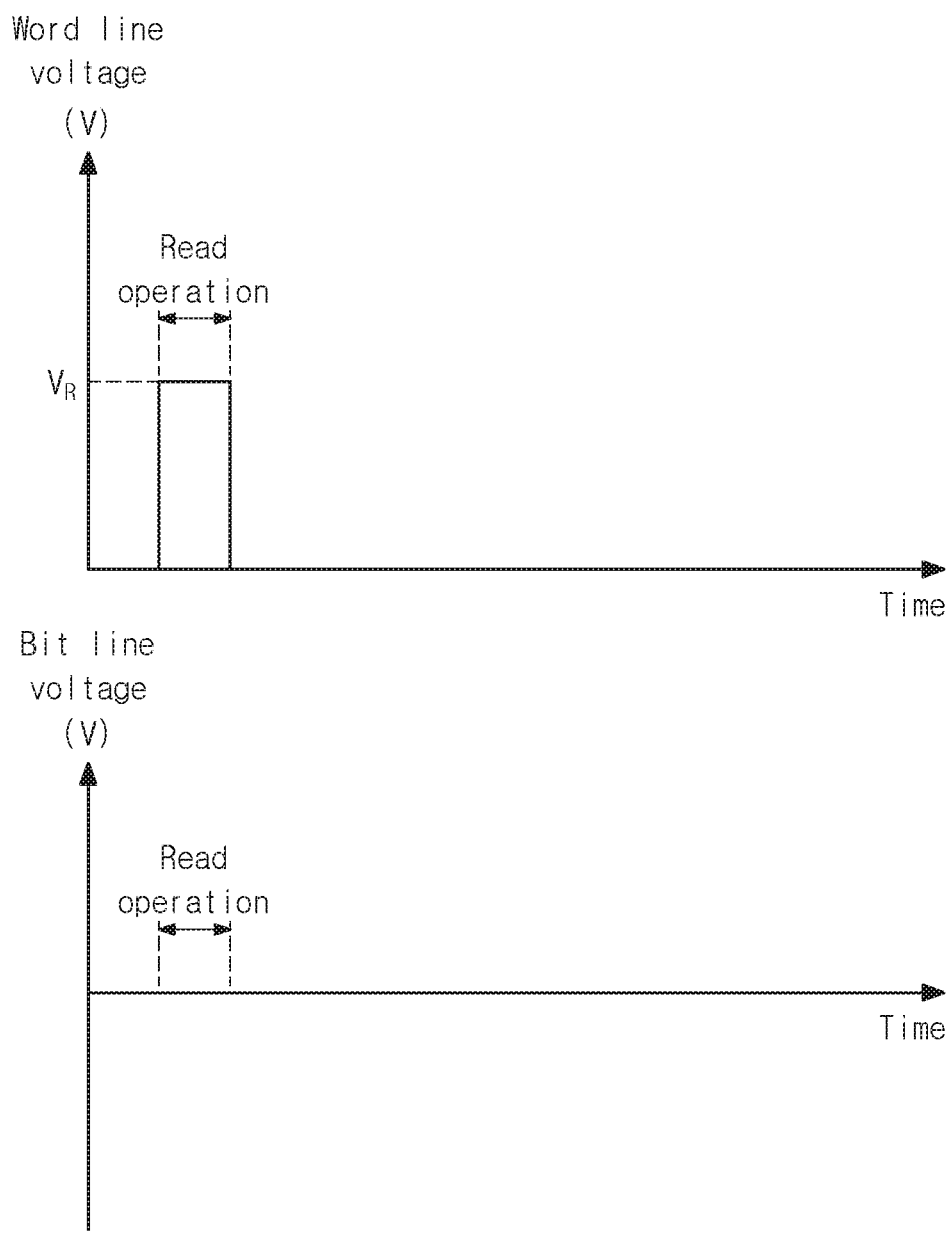
FIG. 19 and FIG. 20 are graphs illustrating a reading operation of a memory device, according to an embodiment of the inventive concept.
Figure 20:
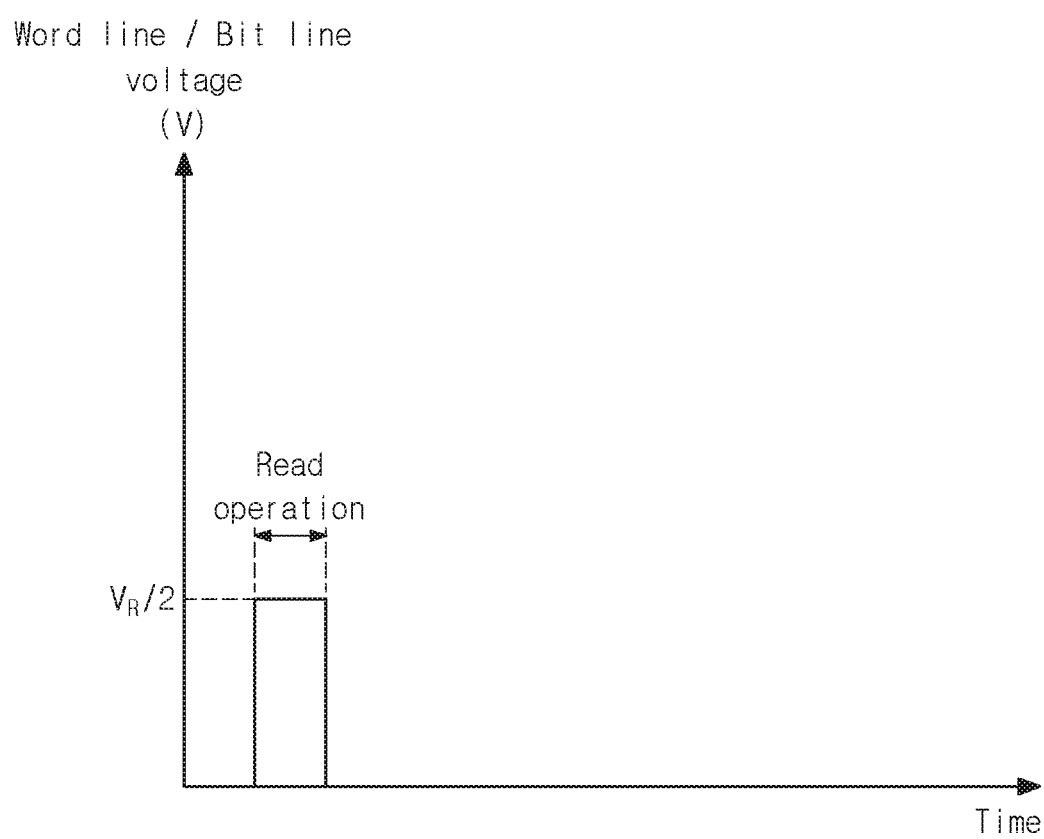

FIGS. 19 and 20 are graphs illustrating a read operation of a memory device, according to an embodiment of the inventive concept. In a read operation, as illustrated in FIG. 19, a voltage $V_R$ for the read operation is applied to the word line connected with the memory element to be subject to the read operation, and a bit line is grounded. Accordingly, the voltage of $V_R$ is applied across both terminals of the memory element such that a current flows.

In the case of remaining memory elements other than the memory element subject to the read operation, the voltage of $V_R/2$ is applied to the word line and the bit line as illustrated in FIG. 20. In this case, the voltage across both terminals of the rest memory cells becomes 0V, and thus current does not flow. The write, delete, and read operations of the memory device according to the present embodiment are not limited to the above description.

Figure 21:
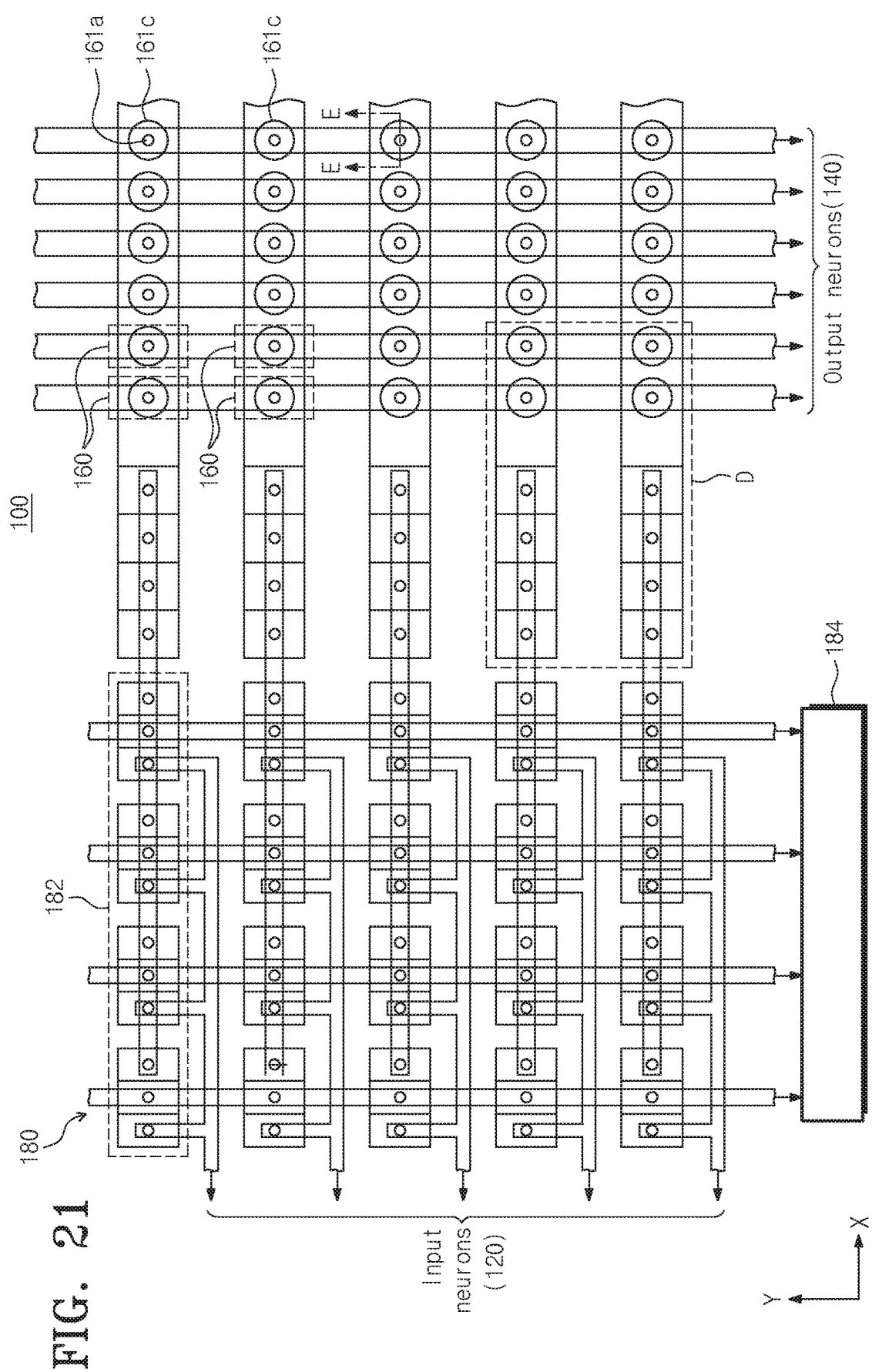
FIG. 21 is a plan view illustrating a neuromorphic system, according to a still another embodiment of the inventive concept.
Figure 22:
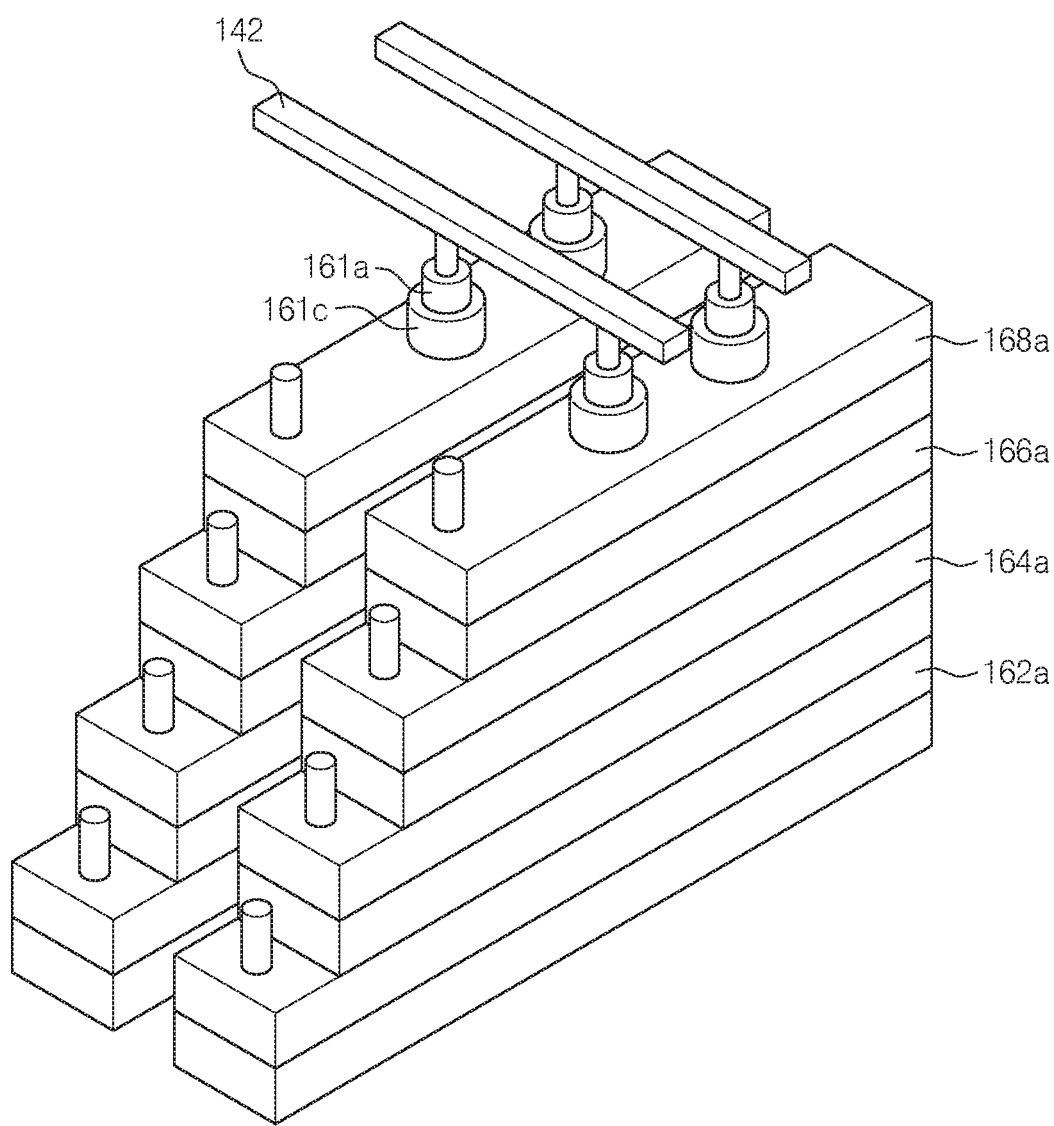
FIG. 22 is an enlarged perspective view of part 'D' of FIG. 21.
Figure 23:
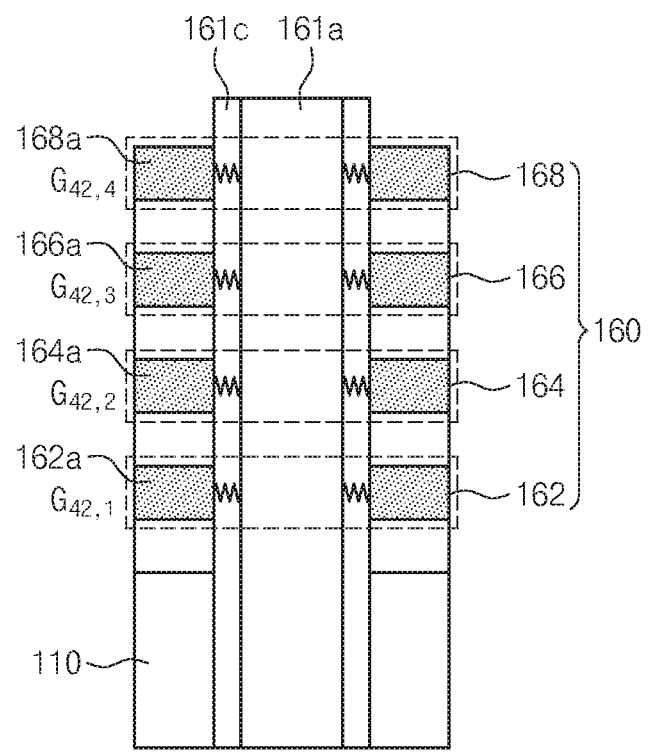
FIG. 23 is a sectional view taken along line E-E of FIG. 21.

FIG. 21 is a plan view illustrating a neuromorphic system, according to a still another embodiment of the inventive concept. FIG. 22 is an enlarged perspective view of part 'D' of FIG. 21. FIG. 23 is a sectional view taken along line E-E of FIG. 21. In description of an embodiment of FIGS. 21 to 23, duplicated description with respect to the same or corresponding component as that according to the foregoing embodiment may be omitted.

According to FIGS. 21 to 23, the synapse unit includes stacked electrodes 162a, 164a, 166a, 168a, a cylindrical pillar electrode 161a inserted vertically in the electrodes 162a, 164a, 166a, 168a, the electrodes 162a, 164a, 166a, 168a, and a cylindrical resistive switching layer 161c between the pillar electrode 161a and the electrodes 162a, 164a, 166a, 168a, surrounding the pillar electrode 161a. The pillar electrode 161a and the resistive switching layer 161c may be provided in a cylindrical shape for an edge rounding effect and a field concentration effect of the circular structure.

Figure 24:
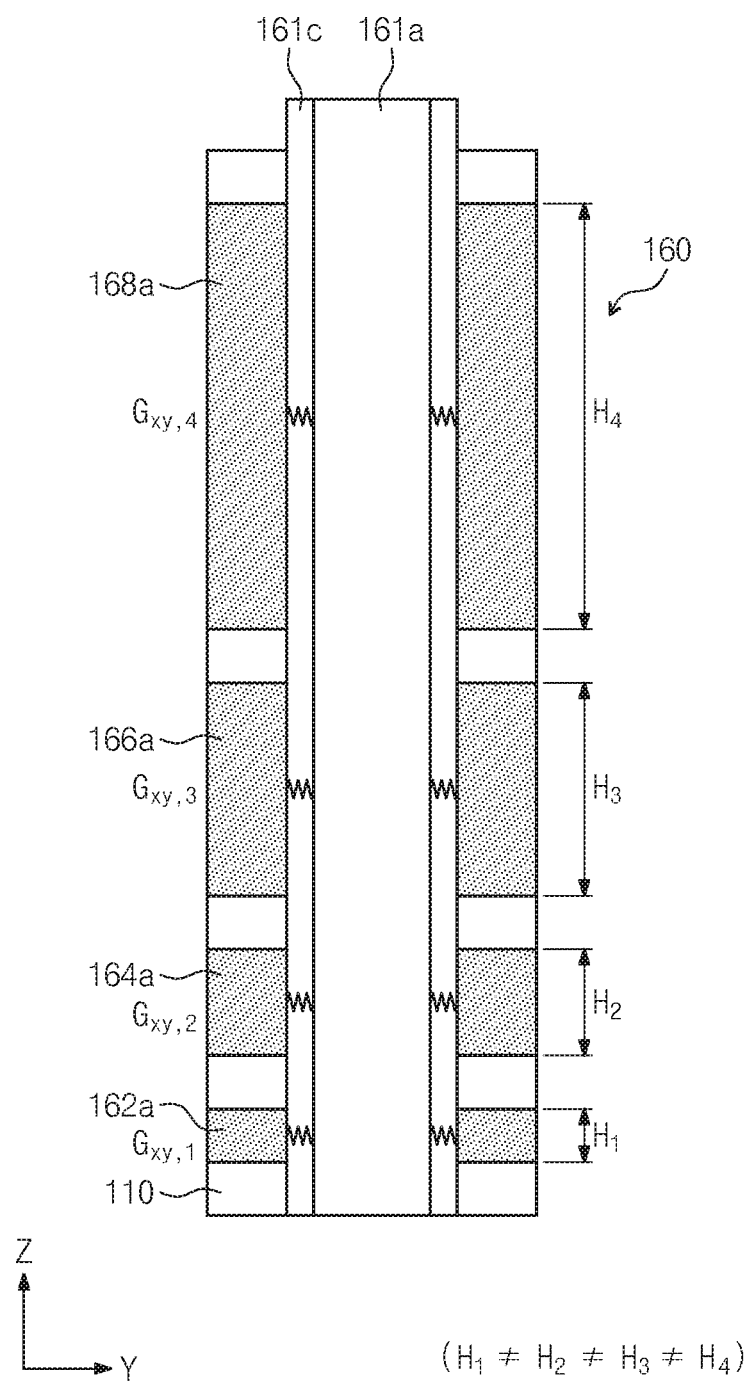
FIGS. 24 and 25 are views illustrating that conductances of the synapse elements constituting the neuromorphic system of FIGS. 21 to 23 are designed with different values.
Figure 25:
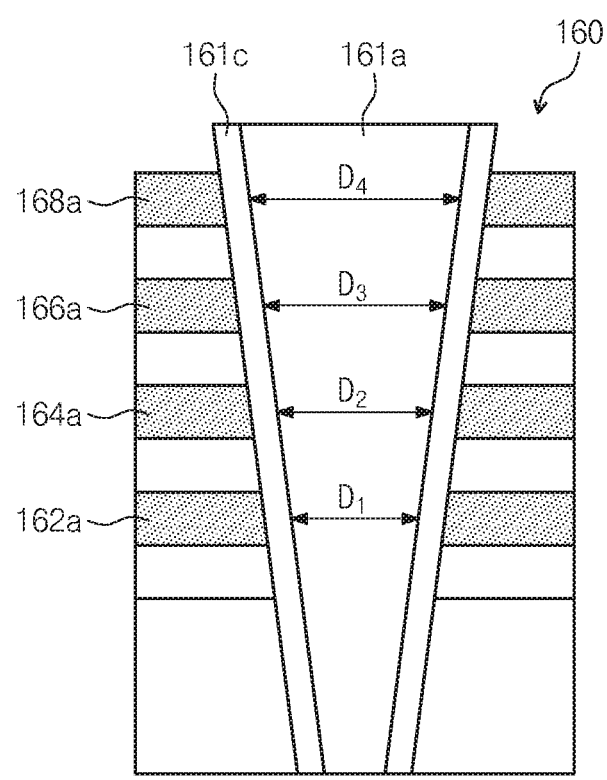

FIGS. 24 and 25 are views illustrating that conductances of the synapse elements constituting the neuromorphic system of FIGS. 21 to 23 are designed with different values. In the case that the synapse elements constituting the synapse unit 160 have different characteristics, even if the synapse elements are activated in equal number, the synapse unit may have different levels depending on conductances of synapse elements activated. Accordingly, more multi-levels may be implemented when comparing with the case that the synapse elements have the same characteristics.

In one embodiment, when the synapse element is implemented with a resistive switching material, thicknesses H1, H2, H3, and H4, widths, or the composition ratios of the synapse elements may be changed to adjust the conductance characteristics of the synapse elements, as FIG. 24.

In other embodiment, a flat area or diameter of the pillar electrode 161a may vary in the vertical direction as FIG. 25 to adjust the conductance characteristics of the synapse elements. In one embodiment, the pillar electrode 161a may have a truncated cone shape of which diameters $D_1$, $D_2$, $D_3$, $D_4$ increase or decrease in the stack direction (vertical direction) of the synapse elements. Alternatively, the pillar electrode 161a may have a structure which cylindrical plates having different diameter are stacked. The resistive switching layer 161c may have a cylindrical shell surrounding the pillar electrode 161a.

Figure 26:
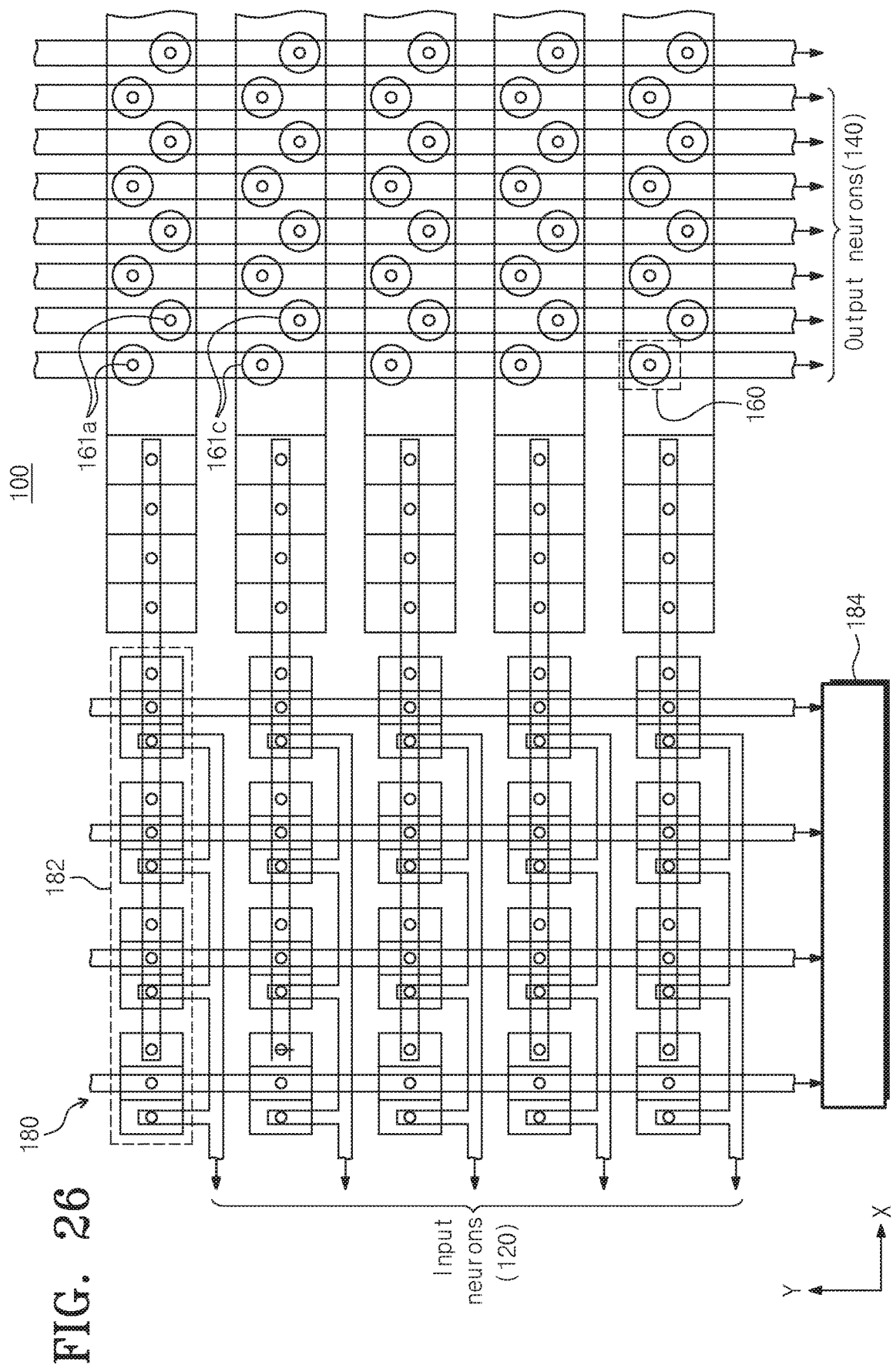
FIG. 26 is a plan view illustrating a neuromorphic system, according to a still yet another embodiment of the inventive concept.

FIG. 26 is a plan view illustrating a neuromorphic system, according to a still yet another embodiment of the inventive concept. Referring to FIG. 26, pillar electrodes 161a may be provided in a zigzag pattern in a row direction (x) to reduce the whole array size. According to the embodiment of FIG. 26, synapse units 160 may be formed more compactly, and thereby the degree of the integration of a semiconductor device may increase. The shape and arrangement of the pillar electrodes 161a and the resistive switching layers 161c may also be applied to the embodiments of the memory device.

According to an embodiment of the inventive concept, there are provided a neuromorphic system and a memory device, capable of satisfying both of a multi-level operation and information retention.

In addition, according to an embodiment of the inventive concept, there are provided a neuromorphic system, capable of gradually and symmetrically changing the weight of a synapse unit, and a memory device.

In addition, according to an embodiment of the inventive concept, there are provided a neuromorphic system, capable of increasing the number of levels, which is able to be implemented through a synapse unit, and of representing a high degree of integration, and a memory device.

The effects produced in the inventive concept are not limited to the above-mentioned effects. Other effects, which are not mentioned, will be apparently understood from the inventive concept and accompanying drawings by those skilled in the art unless otherwise defined.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A neuromorphic system comprising:
input neurons configured to provide input signals;
output neurons configured to provide output signals; and
a plurality of synapse units provided at interconnecting points between the input neurons and the output neurons,
wherein each of the plurality of synapse units comprises a plurality of synapse elements connected in parallel to each other between one input neuron among the input neurons and one output neuron among the output neurons, and
wherein each of the synapse units include:
stacked electrodes spaced apart from each other in a vertical direction and connected with the input neuron;
a pillar electrode extending in the vertical direction and connected with the output neuron; and
a resistive switching layer between the pillar electrode and the stacked electrodes.

2. The neuromorphic system of claim 1, further comprising:
a selection unit connected between the input neuron and the plurality of synapse units and configured to operatively select and connect at least one synapse element from the plurality of synapse elements to the input neuron, so that the input signal is transmitted from the input neuron through the selected at least one synapse element to the output neuron.

3. The neuromorphic system of claim 2, wherein the selection unit includes pass transistors connected with the plurality of synapse elements, respectively, in series.

4. The neuromorphic system of claim 3, wherein the selection unit further includes a controller configured to control operations of the pass transistors to adjust a weight of each synapse unit.

5. The neuromorphic system of claim 3, wherein each pass transistor has a channel width corresponding to a conductance of a synapse element connected with a corresponding pass transistor.

6. The neuromorphic system of claim 1, wherein
the resistive switching layer comprises a material allowing resistive switching depending on the input signal of the input neuron and the output signal of the output neuron.

7. The neuromorphic system of claim 1, wherein the plurality of synapse units are formed in a plurality of rows and a plurality of columns and arranged in a lattice structure, and
wherein synapse units arranged in different rows are electrically connected with mutually different input neurons.

8. The neuromorphic system of claim 7, wherein the pillar electrode is shared between two adjacent rows of synapse units.

9. The neuromorphic system of claim 1, wherein pillar electrodes of the plurality of synapse units are arranged in a checker board pattern or zigzag pattern in a row direction.

10. The neuromorphic system of claim 1, wherein a flat area or a diameter of the pillar electrode varies in the vertical direction.

11. The neuromorphic system of claim 1, wherein the pillar electrode has a cylindrical shape or a truncated cone shape.

12. The neuromorphic system of claim 1, wherein the plurality of synapse elements are provided to have conductances different from each other.

13. The neuromorphic system of claim 12, wherein the conductances of the plurality of synapse elements are doubly increased.

14. The neuromorphic system of claim 1, wherein each synapse element includes a resistive switching material, a phase change material, or a memory cell.

15. A memory device comprising:
word lines;
bit lines; and
a plurality of memory cells provided at interconnecting points between the word lines and the bit lines,
wherein each of the plurality of memory cells at each interconnecting point comprises a plurality of memory elements connected in parallel to each other between one word line among the word lines and one bit line among the bit lines,
wherein the plurality of memory cells are formed in a lattice structure including a plurality of rows and a plurality of columns,
wherein memory cells arranged in one row among the plurality of rows are capable of being connected with the one word line among the word lines,
wherein the memory device further includes:
a selection unit connected between the one word line and the memory cells arranged in the one row,
wherein the selection unit is configured to operatively select and connect at least one memory element from the plurality of memory elements to the one word line, and
wherein each of the plurality of memory elements includes:
stacked electrodes spaced apart from each other in a vertical direction and connected with the one word line;
a pillar electrode extending in the vertical direction and connected with the at least one memory element; and
a memory layer between the pillar electrode and the stacked electrodes.

16. The memory device of claim 15, wherein the selection unit includes:
pass transistors connected with the plurality of memory elements in series, respectively; and
a controller configured to control operations of the pass transistors.

17. The memory device of claim 15, wherein memory cells arranged in other rows are electrically connected with mutually different word lines, respectively, and
wherein the pillar electrode is shared between adjacent two rows of memory cells.

18. The memory device of claim 15, wherein a flat area or a diameter of the pillar electrode varies in the vertical direction.

* * * * *

UNITED STATES PATENT AND TRADEMARK OFFICE
CERTIFICATE OF CORRECTION

PATENT NO. : 11,055,603 B2  
APPLICATION NO. : 15/643902  
DATED : July 6, 2021  
INVENTOR(S) : Park et al.

Page 1 of 1

It is certified that error appears in the above-identified patent and that said Letters Patent is hereby corrected as shown below:

On the Title Page

Item (73) should read:  
--SEOUL NATIONAL UNIVERSITY R&DB FOUNDATION, Seoul (KR); PUSAN NATIONAL UNIVERSITY INDUSTRY-UNIVERSITY COOPERATION FOUNDATION, Busan (KR)--

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*